US010627124B2

(12) United States Patent
Walser et al.

(10) Patent No.: US 10,627,124 B2
(45) Date of Patent: Apr. 21, 2020

(54) SYSTEMS AND METHODS FOR AUTO-COMMISSIONING AND SELF-DIAGNOSTICS

(71) Applicant: Johnson Controls Technology Company, Plymouth, MI (US)

(72) Inventors: J. Carlin Walser, Norman, OK (US); Saman Beyhaghi, Hartford, WI (US); Matthew J. Asmus, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 119 days.

(21) Appl. No.: 15/437,318

(22) Filed: Feb. 20, 2017

(65) Prior Publication Data

US 2017/0159962 A1 Jun. 8, 2017

Related U.S. Application Data

(63) Continuation of application No. 14/186,999, filed on Feb. 21, 2014, now Pat. No. 9,581,985.

(51) Int. Cl.
*G01M 1/38* (2006.01)
*F24F 11/30* (2018.01)
*G05B 15/02* (2006.01)
*G05B 19/048* (2006.01)

(52) U.S. Cl.
CPC .............. *F24F 11/30* (2018.01); *G05B 15/02* (2013.01); *G05B 19/048* (2013.01); *G05B 2219/24053* (2013.01); *G05B 2219/2614* (2013.01); *G05B 2219/2642* (2013.01)

(58) Field of Classification Search
CPC ........................................................ F24F 11/30
USPC ........................................................... 700/275
See application file for complete search history.

(56) References Cited

U.S. PATENT DOCUMENTS

| 5,347,821 | A | 9/1994 | Oltman et al. |
| 5,355,691 | A | 10/1994 | Sullivan et al. |
| 5,419,146 | A | 5/1995 | Sibik et al. |
| 5,447,037 | A | 9/1995 | Bishop et al. |
| 5,533,348 | A | 7/1996 | Baldwin et al. |
| 5,823,004 | A | 10/1998 | Polley et al. |
| 6,223,544 | B1 * | 5/2001 | Seem .................. F24F 11/30 62/127 |
| 6,374,631 | B1 | 4/2002 | Lifson et al. |

(Continued)

*Primary Examiner* — Evral E Bodden
(74) *Attorney, Agent, or Firm* — Foley & Lardner LLP

(57) ABSTRACT

A method for testing a cooling component in a building HVAC system uses a state-based testing procedure. The method includes providing a control signal to the cooling component. The control signal instructs the cooling component to activate. The method includes monitoring feedback from a temperature sensor configured to measure temperature affected by the cooling component and evaluating a state transition condition by comparing the feedback from the temperature sensor to a threshold value. The state transition condition is satisfied if the feedback is less than the threshold value and not satisfied if the feedback is not less than the threshold value. The method includes transitioning into a pass state in response to the feedback from the temperature sensor satisfying the state transition condition and transitioning into a fail state in response to the feedback from the temperature sensor not satisfying the state transition condition.

23 Claims, 11 Drawing Sheets

(56) References Cited

U.S. PATENT DOCUMENTS

| | | |
|---|---|---|
| 6,427,461 B1 | 8/2002 | Whinery et al. |
| 6,434,960 B1 | 8/2002 | Rousseau |
| 6,474,087 B1 | 11/2002 | Lifson |
| 6,532,754 B2 | 3/2003 | Haley et al. |
| 6,644,049 B2 | 11/2003 | Alford |
| 6,701,723 B1 | 3/2004 | Dobmeier et al. |
| 6,820,434 B1 | 11/2004 | Gutheim et al. |
| 6,857,578 B2 | 2/2005 | Alvarez et al. |
| 6,919,809 B2 | 7/2005 | Blunn et al. |
| 7,100,382 B2 | 9/2006 | Butler et al. |
| RE39,597 E | 5/2007 | Rousseau |
| 7,225,054 B2 | 5/2007 | Amundson et al. |
| 7,228,707 B2 | 6/2007 | Lifson et al. |
| 7,243,004 B2 | 7/2007 | Shah et al. |
| 7,257,958 B2 | 8/2007 | Bush et al. |
| 7,383,158 B2 | 6/2008 | Krocker et al. |
| 7,389,159 B2 | 6/2008 | Warren et al. |
| 7,455,238 B2 | 11/2008 | Hugghins |
| 7,590,469 B2 | 9/2009 | Grohman |
| 7,600,694 B2 | 10/2009 | Helt et al. |
| 7,650,206 B2 | 1/2010 | Hudson |
| 7,748,225 B2 | 7/2010 | Butler et al. |
| 7,775,452 B2 | 8/2010 | Shah et al. |
| 7,793,513 B2 | 9/2010 | Aldridge et al. |
| 7,821,218 B2 | 10/2010 | Butler et al. |
| 7,837,128 B2 | 11/2010 | Helt et al. |
| 7,840,311 B2 | 11/2010 | Grohman |
| 7,844,764 B2 | 11/2010 | Williams |
| 7,913,501 B2 | 3/2011 | Ellis et al. |
| 7,966,838 B2 | 6/2011 | Lifson et al. |
| 7,975,494 B2 | 7/2011 | Boydstun et al. |
| 7,997,091 B2 | 8/2011 | Lifson et al. |
| 7,997,092 B2 | 8/2011 | Lifson et al. |
| 8,731,724 B2 | 5/2014 | Drees et al. |
| 9,285,802 B2 * | 3/2016 | Arensmeier ....... G05B 23/0224 |
| 2006/0273183 A1 | 12/2006 | Cavanagh et al. |
| 2007/0185686 A1 * | 8/2007 | Singhal ................. G05B 15/02 702/185 |
| 2008/0054082 A1 | 3/2008 | Evans et al. |
| 2009/0113900 A1 | 5/2009 | Lifson et al. |
| 2009/0222139 A1 | 9/2009 | Federspiel |
| 2010/0071391 A1 | 3/2010 | Lifson et al. |
| 2010/0106319 A1 | 4/2010 | Grohman et al. |
| 2010/0125368 A1 | 5/2010 | Bailey et al. |
| 2010/0250009 A1 | 9/2010 | Lifson et al. |
| 2010/0286799 A1 | 11/2010 | Matsen et al. |
| 2010/0295700 A1 | 11/2010 | Mauk et al. |
| 2010/0298981 A1 | 11/2010 | Chamorro et al. |
| 2010/0298982 A1 | 11/2010 | Chamorro et al. |
| 2010/0298983 A1 | 11/2010 | Beste et al. |
| 2010/0298984 A1 | 11/2010 | Mauk et al. |
| 2010/0298985 A1 | 11/2010 | Hess et al. |
| 2010/0298986 A1 | 11/2010 | Stachler |
| 2010/0298987 A1 | 11/2010 | Bennett et al. |
| 2010/0298988 A1 | 11/2010 | Stachler et al. |
| 2010/0298989 A1 | 11/2010 | Hess et al. |
| 2010/0299563 A1 | 11/2010 | Stachler |
| 2010/0324741 A1 | 12/2010 | House et al. |
| 2011/0097988 A1 | 4/2011 | Lord |
| 2011/0138827 A1 | 6/2011 | Lifson et al. |
| 2011/0202180 A1 | 8/2011 | Kowald et al. |
| 2012/0245878 A1 | 9/2012 | Kane et al. |
| 2012/0318073 A1 * | 12/2012 | Zavodny ............ B01D 46/0086 73/862.581 |
| 2013/0128396 A1 | 5/2013 | Danesh et al. |
| 2013/0338836 A1 * | 12/2013 | Vaughn .................. G05D 23/19 700/276 |
| 2016/0069584 A1 | 3/2016 | Holaso et al. |

* cited by examiner

| | | Command Hierarchy | | | | | | | | | |
|---|---|---|---|---|---|---|---|---|---|---|---|
| Global Fault | Fan State In | C1 State In | C2 State In | C3 State In | C4 State In | H1 State In | H2 State In | H3 State In | Econ State In | Exhaust State In | State |
| True | * | * | * | * | * | * | * | * | * | * | Off |
| False | Not Run | * | * | * | * | * | * | * | * | * | Off |
| False | Av | * | * | * | * | * | * | * | * | * | Test Fan |
| False | Fail | * | * | * | * | * | * | * | * | * | Off |
| False | Pass | Av | * | * | * | * | * | * | * | * | Test C1 |
| False | Pass | !Av | Av | * | * | * | * | * | * | * | Test C2 |
| False | Pass | !Av | !Av | Av | * | * | * | * | * | * | Test C3 |
| False | Pass | !Av | !Av | !Av | Av | * | * | * | * | * | Test C4 |
| False | Pass | !Av | !Av | !Av | !Av | Av | * | * | * | * | Test H1 |
| False | Pass | !Av | !Av | !Av | !Av | !Av | Av | * | * | * | Test H2 |
| False | Pass | !Av | !Av | !Av | !Av | !Av | !Av | Av | * | * | Test H3 |
| False | Pass | !Av | !Av | !Av | !Av | !Av | !Av | !Av | Av | * | Test Econ |
| False | Pass | !Av | !Av | !Av | !Av | !Av | !Av | !Av | !Av | Av | Test Exhaust |
| False | Pass | !Av | !Av | !Av | !Av | !Av | !Av | !Av | !Av | !Av | Off |

FIG. 4B

SYSTEMS AND METHODS FOR AUTO-COMMISSIONING AND SELF-DIAGNOSTICS

CROSS-REFERENCE TO RELATED PATENT APPLICATION

This application is a continuation of U.S. patent application Ser. No. 14/186,999 filed Feb. 21, 2014, the entire disclosure of which is incorporated by reference herein.

BACKGROUND

The present invention relates generally to the field of heating, ventilation, and air conditioning (HVAC) systems. The present invention relates more particularly to systems and methods for automating the commissioning and testing of HVAC equipment.

HVAC control systems are used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and a controller for receiving feedback from the measurement devices and providing a control signal to the control devices. Some HVAC control systems include a main controller and one or more auxiliary controllers (e.g., a fan controller, a cooling controller, a heating controller, a damper controller, etc.).

Commissioning and testing HVAC equipment can be a time-consuming process. Current commissioning and testing methods typically require the involvement of a service technician throughout the commissioning process. The service technician may be required to initiate and manage the testing of multiple HVAC systems or devices. Additionally, the technician may be required to interpret the testing results and to diagnose any issues with the HVAC equipment. For large buildings with many HVAC systems, sub-systems, or devices, the process of commissioning and testing the HVAC equipment can be challenging and time-consuming.

SUMMARY

One implementation of the present disclosure is a system for performing automated testing and self-diagnostics of equipment in a building management system. The system includes a self-testing module implemented in a control unit of the building management system. The self-testing module is configured to exercise equipment of the building management system using a state-based testing procedure that differs from normal operation of the equipment. The self-testing module is configured to monitor feedback received from a sensor of the building management system in response to exercising the equipment during the state-based testing procedure. The self-testing module is configured to use the feedback from the sensor to evaluate a state transition condition of the state-based testing procedure and to transition between states of the state-based testing procedure using a result of the evaluation.

In some embodiments, the self-testing module is configured to operate as a finite state machine, using feedback from the building management system to control transitions between operating states of the state-based testing procedure.

In some embodiments, the self-testing module is configured to concurrently operate in multiple different operating states, each of the multiple different operating states corresponding to a current operating state of a different state-based test of the equipment. In some embodiments, the state-based tests include at least two of a state-based fan diagnostic, a state-based cooling diagnostic, a state-based heating diagnostic, a state-based economizer diagnostic, and a state-based exhaust diagnostic.

In some embodiments, the self-testing module is configured to monitor a set of test selection inputs received at the self-testing module. Each of the test selection inputs may correspond to a different diagnostic test. The self-testing module may be configured to use the set of test selection inputs to determine which of a plurality of diagnostic tests to perform during the state-based testing procedure.

In some embodiments, the self-testing module is configured to identify a plurality of state transition conditions. Each state transition condition may include a criterion for transitioning into a different potential operating state. The self-testing module may be configured to use feedback from the building management system to evaluate the plurality of state transition conditions and to transition into one of the potential operating states using a result of the evaluation.

In some embodiments, each of the potential operating states indicates a different result of the state-based testing procedure. The self-testing module may be configured to output a result of the state-based testing procedure by identifying and reporting an operating state into which a state transition has occurred as a result of the evaluation.

In some embodiments, the control unit includes a user interface configured to present results of the state-based testing procedure. The results may include an indication of a particular state-based test and a current state status of the particular state-based test.

In some embodiments, the system further includes an auxiliary control unit in communication with the self-testing module. The auxiliary control unit may be configured to provide a control output to the equipment of the building management system. The self-testing module may be configured to output a testing state to the auxiliary control unit. The testing state may cause the auxiliary control unit to enter a testing mode in which the self-testing module controls the control output provided from the auxiliary control unit to the equipment of the building management system.

Another implementation of the present disclosure is a method for performing automated testing and self-diagnostics of equipment in a building management system. The method includes exercising equipment of the building management system using a state-based testing procedure that differs from normal operation of the equipment, monitoring feedback received from a sensor of the building management system in response to exercising the equipment during the state-based testing procedure, using the feedback from the sensor to evaluate a state transition condition of the state-based testing procedure, and transitioning between states of the state-based testing procedure using a result of the evaluation.

In some embodiments, the exercising, monitoring, using, and transitioning steps are performed automatically by a self-testing module implemented in a control unit of the building management system. The self-testing module may be configured to operate as a finite state machine, using feedback from the building management system to control transitions between operating states of the state-based testing procedure In some embodiments, the method further includes concurrently operating in multiple different operating states.

Each of the multiple different operating states may correspond to a current operating state of a different state-based test of the equipment.

In some embodiments, the state-based tests include at least two of a state-based fan diagnostic, a state-based cooling diagnostic, a state-based heating diagnostic, a state-based economizer diagnostic, and a state-based exhaust diagnostic. In some embodiments, the method further includes monitoring a set of test selection inputs. Each of the test selection inputs may correspond to a different diagnostic test. In some embodiments, the method further includes using the set of test selection inputs to determine which of a plurality of diagnostic tests to perform during the state-based testing procedure.

In some embodiments, the method further includes identifying a plurality of state transition conditions. Each state transition condition may include a criterion for transitioning into a different potential operating state. In some embodiments, the method further includes using feedback from the building management system to evaluate the plurality of state transition conditions and transitioning into one of the potential operating states using a result of the evaluation.

In some embodiments, each of the potential operating states indicates a different result of the state-based testing procedure. The method may further include outputting a result of the state-based testing procedure by identifying and reporting an operating state into which a state transition has occurred as a result of the evaluation.

In some embodiments, the method further includes presenting results of the state-based testing procedure via a user interface. The results may include an indication of a particular state-based test and a current state status of the particular state-based test.

Another implementation of the present disclosure is a system for performing automated diagnostics of building equipment. The system includes a control unit in communication with building equipment. The control unit is configured to test the building equipment using a state-based diagnostic test. The state-based diagnostic test includes exercising the building equipment in a first state of the state-based diagnostic test, monitoring feedback from the building equipment in response to the exercising, using the feedback from the building equipment to evaluate a state transition condition of the state-based diagnostic test, and transitioning from the first state into a result state of the state-based diagnostic test in response to the feedback from the building equipment satisfying the state transition condition.

In some embodiments, the control unit is configured to test multiple components of the building equipment using multiple different state-based diagnostic tests. Each of the multiple different state-based diagnostic tests may have a current operating state. The control unit may be configured to operate in each of the current operating states concurrently.

In some embodiments, the control unit is configured to use the feedback from the building equipment to evaluate a plurality of state transition conditions. Each of the state transition conditions may include a criterion for transitioning into a different potential result state of the state-based diagnostic test. The control unit may be configured to transition into one of the potential result states using a result of the evaluation and to output a result of the state-based diagnostic test by identifying and reporting the result state into which a state transition has occurred as a result of the evaluation.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 4B is a drawing of a command hierarchy for controlling an order in which multiple diagnostic tests of the state-based testing procedure are performed, according to an exemplary embodiment.

DETAILED DESCRIPTION

Figure 1:
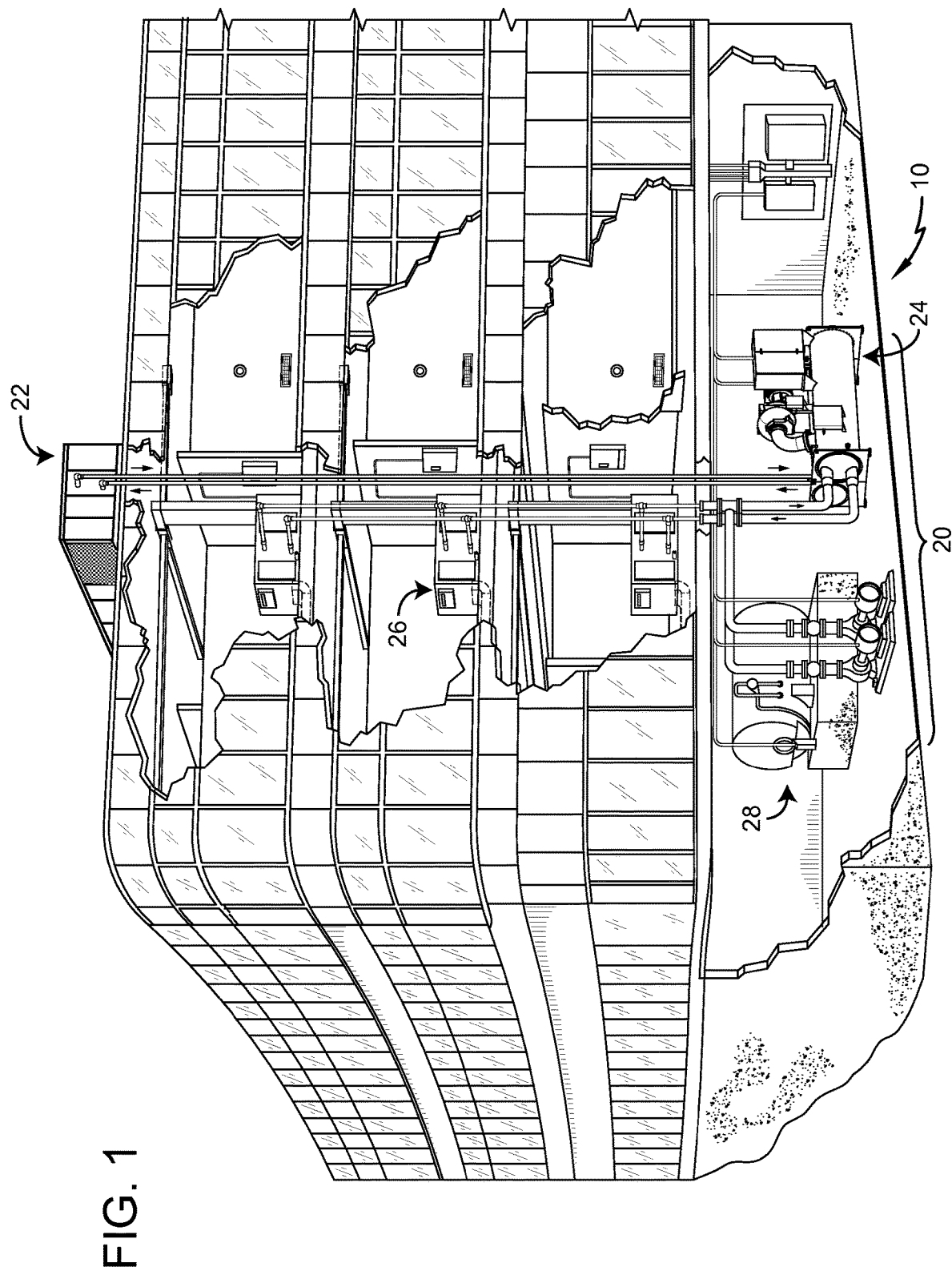
FIG. 1 is a drawing of a building equipped with a building management system, according to an exemplary embodiment.

Referring generally to the FIGURES, systems and methods for auto-commissioning and self-diagnostics are shown, according to an exemplary embodiment. The systems and methods described herein may be used to automate the commissioning and testing of HVAC equipment in a building management system. In some embodiments, a self-testing module is implemented as part of a local controller in a building HVAC system. For example, the self-testing module may be implemented as part of a universal control board (UCB) in a rooftop unit (RTU) for a building HVAC system. The self-testing module may communicate with one or more auxiliary controllers (e.g., a fan controller, a cooling controller, a heating controller, a damper controller, etc.) or other HVAC equipment (e.g., via a BACnet SA bus or other communications network used by the building management system).

The self-testing module may interact with the auxiliary controllers and/or the HVAC equipment devices to initiate and control a state-based testing procedure. During the state-based testing procedure, the self-testing module may operate as a finite state machine. For example, the self-testing module may output a state that is provided to the auxiliary controllers and which causes the auxiliary controllers to enter a testing mode. In the testing mode, the self-testing module may control the outputs of the auxiliary controllers and may receive inputs from various sensory devices of the HVAC system (e.g., temperature sensors, flow sensors, pressure sensors, voltage sensors, etc.).

The self-testing module may exercise the HVAC equipment (e.g., using a testing sequence that differs from normal operation of the HVAC system) and monitor the sensor inputs. The self-testing module may use the sensor inputs as conditions which control transitions into various testing states (e.g., a fan testing state, a cooling testing state, a heating testing state, etc.). The results of each test may be logged and/or reported by identifying a particular state or sub-state into which the self-testing module transitions as a result of the sensor inputs. For example, in the cooling testing state, the self-testing module may activate a cooling circuit and monitor the temperature of an evaporator associated with the cooling circuit. If the evaporator temperature fails to drop below a threshold value within a predetermined time period, the self-testing module may transition into a specific failure state or warning state indicating that the cooling circuit is not operating as intended. The state into which the self-testing module transitions may indicate the result of the test (e.g., when the test is completed) and/or the test status (e.g., when the test is in progress).

Advantageously, the self-testing module may perform multiple tests of the HVAC equipment concurrently or in an automated sequence. The results of the tests, including the cause of failure for any faulty equipment, may be logged and/or reported. In some embodiments, the self-testing procedure may be initiated remotely (e.g., via a network input) or set to run at a particular time (e.g., at night, over a weekend, etc.). Remote or delayed initiation may be used, for example, for preventative maintenance or pre-use testing (e.g., testing a heating system before the beginning of a heating season) without requiring human involvement at the time of testing.

Referring now to FIG. 1, a perspective view of a building 10 is shown, according to an exemplary embodiment. Building 10 is shown to include a building management system (BMS) 20. BMS 20 can include a heating, ventilation, and air conditioning (HVAC) system, a security system, a lighting system, a fire alerting system, an elevator system, a water management system, a food storage system, a telephone system, another system that is capable of managing building functions or devices, or any combination thereof. In some implementations, BMS 20 may be a METASYS® brand building management system as sold by Johnson Controls, Inc.

BMS 20 is shown to include a plurality of BMS devices 22-28 (e.g., rooftop unit 22, air handling unit 24, variable air volume unit 26, and boiler 28). In some embodiments, BMS 20 may include any number of BMS devices in addition to or in place of BMS devices 22-28. For example, BMS 20 may include measurement devices (e.g., temperature sensors, pressure sensors, flow sensors, etc.), control devices (e.g., actuators, chillers, boilers, air handling units, variable air volume units, etc.), control units (e.g., a main control unit, an auxiliary control unit, a process controller, a supervisory controller, etc.), or other devices for monitoring and controlling any variable condition or state of building 10. BMS devices may be positioned within building 10 (e.g., in a basement, in a building zone, etc.), outside building 10 (e.g., a lighting system, a security system, etc.), or above building 10 (e.g., rooftop unit 22).

Figure 2:
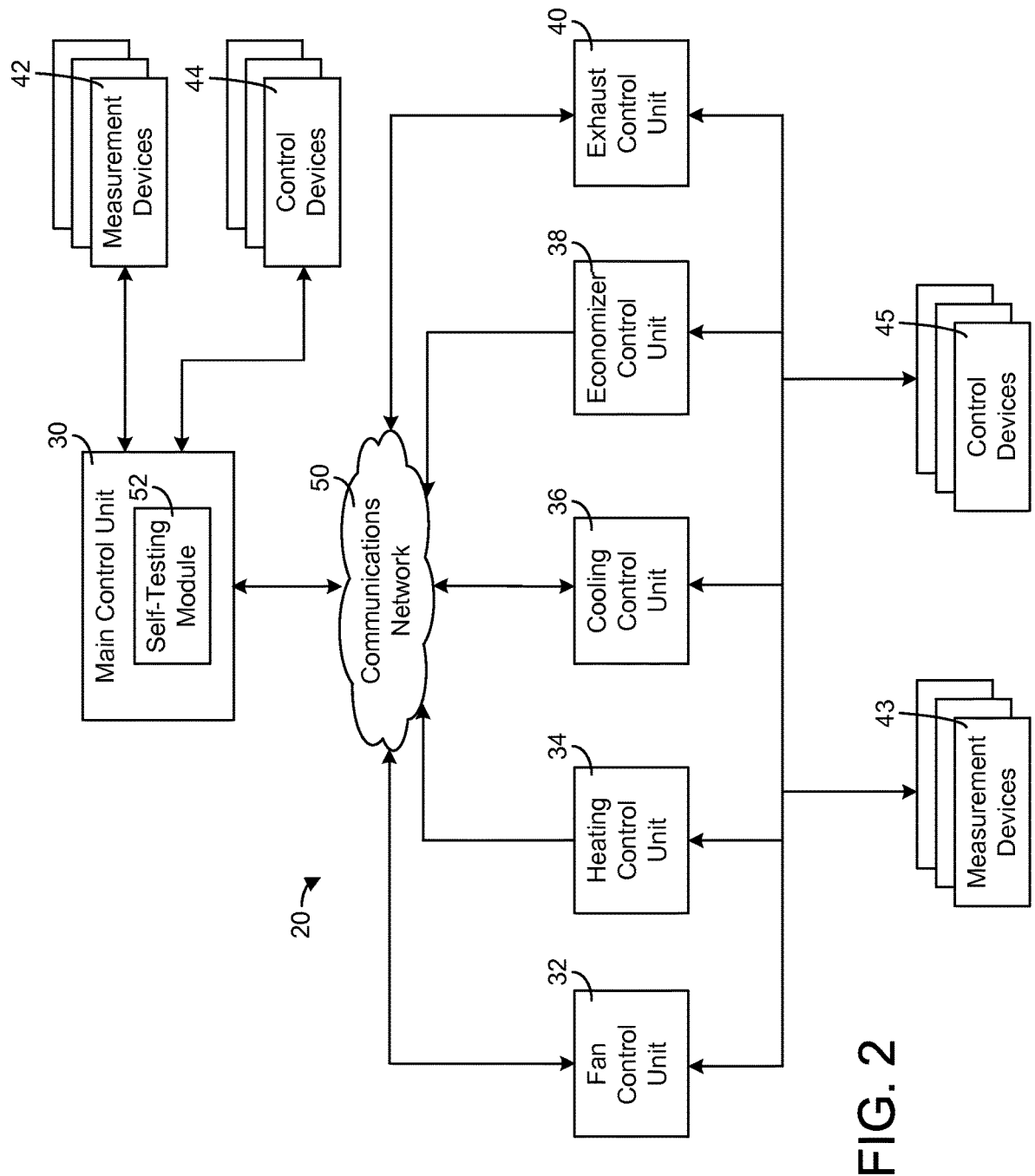
FIG. 2 is a block diagram illustrating the building management system of FIG. 1 in greater detail, the block diagram showing a control unit with a self-testing module for performing a state-based testing procedure of the building management system equipment, according to an exemplary embodiment.

Referring now to FIG. 2, a block diagram illustrating BMS 20 in greater detail is shown, according to an exemplary embodiment. BMS 20 is shown to include a main control unit 30 and a plurality of auxiliary control units 32-40 (i.e., a fan control unit 32, a heating control unit 34, a cooling control unit 36, an economizer control unit 38, and an exhaust control unit 40). In various embodiments, BMS 20 may include a greater or lesser number of auxiliary control units.

In some embodiments, main control unit 30 and auxiliary control units 32-40 are part of a single control unit. Main control unit 30 and auxiliary control units 32-40 may work together to provide various control functions for the single control unit. In some embodiments, main control unit 30 is a primary controller for rooftop unit 22. Auxiliary control units 32-40 may provide supplemental functionality for main control unit 30 and/or facilitate more efficient control over rooftop unit 22. For example, fan control unit 32 may control an air handling unit (AHU), variable air volume (VAV) unit, and/or one or more supply fans (e.g., a single speed fan, a variable speed fan, a constant volume fan, a variable volume fan, etc.). Heating control unit 34 and cooling control unit 36 may provide multi-stage heating and cooling functionality for rooftop unit 22. Economizer control unit 38 may be an economizer for rooftop unit 22 and exhaust control unit 40 may provide exhaust control for rooftop unit 22.

In some embodiments, main control unit 30 and auxiliary control units 32-40 control different types of systems within BMS 20. For example, main control unit 30 may control a HVAC system and auxiliary control units 32-40 may control a lighting system, a security system, a water system, an elevator system, or other types of systems. In other embodiments, main control unit 30 and auxiliary control units 32-40 control a single type of system (e.g., a HVAC system, a lighting system, etc.) within BMS 20. In some embodiments, main control unit 30 and auxiliary control units 32-40 may each control a discrete portion of building 10 (e.g., a different floor, a different building zone, etc.). In other embodiments, main control unit 30 and auxiliary control units 32-40 work together to control a shared portion of building 10.

In some embodiments, main control unit 30 and auxiliary control units 32-40 may not be connected with a supervisory controller or an outside network (e.g., the Internet, a LAN, etc.). For example, in some embodiments, main control unit 30 and auxiliary control units 32-40 may not be part of a complete building management system. In some embodiments, main control unit 30 and auxiliary control units 32-40 are connected to each other via a local communications network (e.g., a BACnet sensor/actuator network) but not to other BMS devices or subsystems. For example, main control unit 30 and auxiliary control units 32-40 may communicate only with each other and the various measurement devices and control devices connected thereto.

Still referring to FIG. 2, main control unit 30 and auxiliary control units 32-40 are shown receiving inputs from measurement devices 42-43 and providing control signals to control devices 44-45. For example, main control unit 30 is shown receiving input signals from measurement devices 42 and providing control signals to control devices 44. Auxiliary control units are shown receiving inputs from measurement devices 43 and providing control signals to control devices 45.

Measurement devices 42-43 may be temperature sensors, pressure sensors, flow sensors, lighting sensors, voltage sensors, current sensors, position sensors, sensor-dependent switches, or any other type of measurement device. Control devices 44-45 may be actuators, chillers, heaters, boilers, air handling units, variable air volume units, fans, dampers, or any other type of device capable of exercising control over a variable state or condition observed by measurement devices 42-43. Main control unit 30 and auxiliary control units 32-40 may utilize any type of control methodology (e.g., feedback control, model predictive control, pattern recognition adaptive control, PID control, feed-forward control, open loop control, etc.) to translate an input signal (e.g., a setpoint, a sensor input, feedback signal, an error signal, etc.) into a control signal for control devices 44-45.

Still referring to FIG. 2, BMS 20 is shown to further include a communications network 50. Communications network 50 may be used to connect main control unit 30 with auxiliary control units 32-40. In some embodiments, communications network 50 may use the Building Automation and Control networks (BACnet) communications protocol to send and receive data between main control unit 30 and auxiliary control units 32-40. The BACnet protocol defines a number of services that are used to communicate between BMS devices. For example, BACnet services may include device and object discovery services (e.g., "Who-Is," "I-Am," "Who-Has," "I-Have," etc.) for identifying and mapping BMS devices. BACnet services may further include data sharing services (e.g., "Read-Property," "Write-Property," etc.) for sending and receiving sensor data and/or control data between main control unit 30 and auxiliary control units 32-40. In various embodiments, communications between main control unit 30, auxiliary control units 32-40, measurement devices 42-43, and control devices 44-45 may be conducted via communications network 50 or directly (e.g., without an intermediary communications network).

Still referring to FIG. 2, main control unit 30 is shown to include a self-testing module 52. Self-testing module 52 may be configured to interact with auxiliary controllers 32-40, measurement devices 42-43, and/or control devices 44-45 to initiate and control a state-based testing procedure. In the state-based testing procedure, self-testing module 52 may operate as a finite state machine. For example, self-testing module 52 may output a state (e.g., a testing state) that is provided to auxiliary controllers 32-40 and which causes one or more of auxiliary controllers 32-40 to enter a testing mode. In the testing mode, self-testing module 52 may provide outputs to control devices 44 and may control the outputs of auxiliary controllers 32-40 (e.g., outputs provided to control devices 45). In the testing mode, self-testing module 52 may receive inputs from measurement devices 42-43.

Self-testing module 52 may be configured to exercise control devices 44-45 in a state-based testing procedure that differs from normal operation of BMS 20. Self-testing module 52 may monitor inputs from measurement devices 42-43 and use the inputs as conditions which control transitions between various testing states (e.g., a fan testing state, a cooling testing state, a heating testing state, etc.). Within each testing state, self-testing module 52 may transition between various sub-states in response to the sensor inputs received from measurement devices 42-43. For example, in a cooling testing state, self-testing module 52 may activate a cooling circuit (e.g., a chiller, a compressor, etc.) and monitor the temperature of an evaporator associated with the cooling circuit. After a predetermined time period has elapsed since entering the cooling testing state, self-testing module 52 may check the temperature of the evaporator. If the evaporator temperature is below a threshold value, self-testing module 52 may transition into a "pass" state indicating that the cooling circuit is operating as intended. If the evaporator temperature is not below the threshold value, self-testing module 52 may transition into a "warning" or "failure" state indicating that the cooling circuit is not operating as intended. The particular state into which self-testing module 52 transitions may indicate the result of the test when the test is completed (e.g., "warning: temperature above threshold value") and/or the status of the test when the test is in progress (e.g., "testing C1"). Self-testing module 52 may log and/or report the results of each test by outputting a particular state or sub-state into which a state transition has occurred (e.g., a pass state, a failure state, a warning state, etc.).

Advantageously, self-testing module 52 may perform multiple tests of the HVAC equipment concurrently or in an automated sequence. The results of the tests, including the cause of failure for any faulty equipment, may be logged and/or reported. In some embodiments, the self-testing procedure may be initiated remotely (e.g., via a network input) or set to run at a particular time (e.g., at night, over a weekend, etc.). Remote or delayed initiation may be used, for example, for preventative maintenance or pre-use testing (e.g., testing a heating system before the beginning of a heating season) without requiring human involvement at the time of testing.

Figure 3:
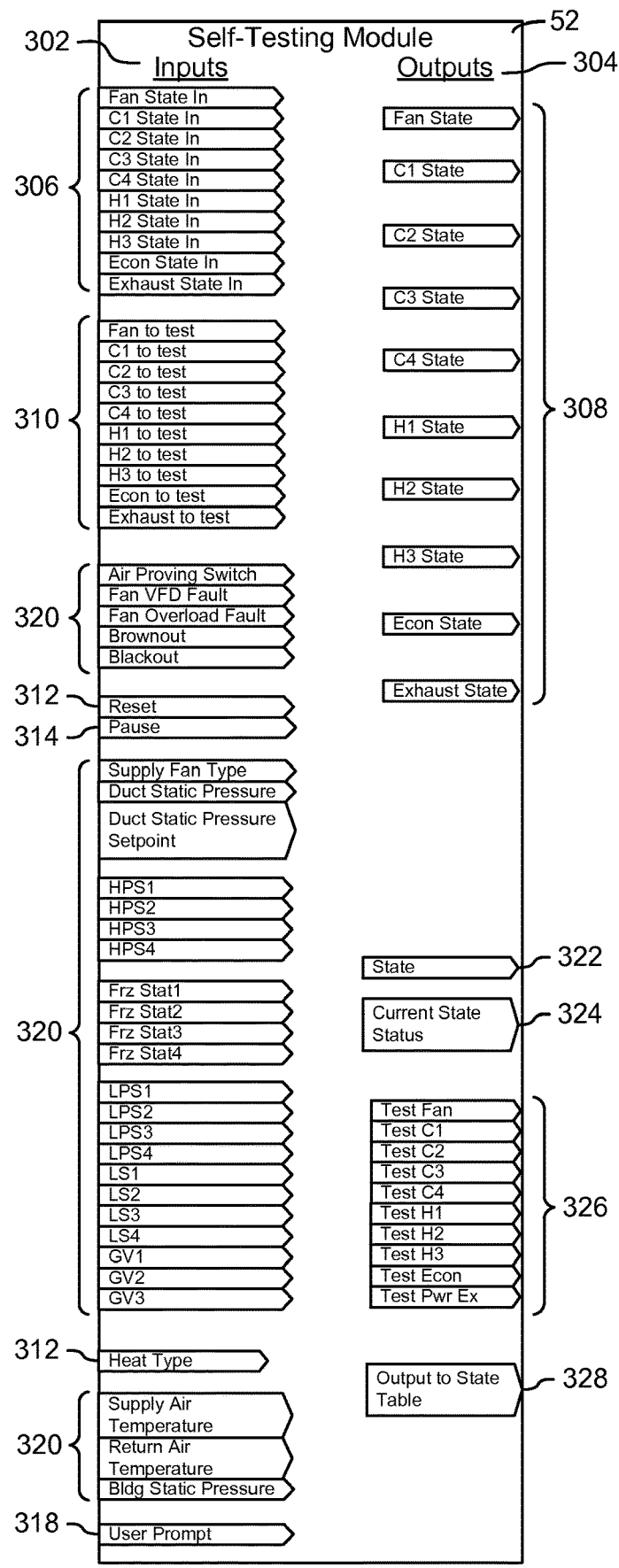
FIG. 3 is a drawing illustrating the self-testing module of FIG. 2 in greater detail, showing various inputs received by the self-testing module from the building equipment and various outputs provided by the self-testing module, according to an exemplary embodiment.

Referring now to FIG. 3, a block diagram illustrating self-testing module 52 in greater detail is shown, according to an exemplary embodiment. Self-testing module 52 may be configured to operate as a finite state machine and to test various components of BMS 20 using a state-based testing procedure. Self-testing module 52 is shown to include set of inputs 302 and a set of outputs 304. Inputs 302 may be received from auxiliary control units 32-40, measurement devices 42-43, and/or from a user interface of main control unit 30. Self-testing module 52 may use inputs 302 as conditions which trigger transitions between states in the state-based testing procedure. Outputs 304 may be determined by self-testing module 52 as a function of inputs 302. In some embodiments, outputs 304 indicate a current testing state or sub-state of self-testing module 52. Outputs 304 may be recorded, stored, and/or provided to a user interface to indicate a result of each test.

Still referring to FIG. 3, inputs 302 are shown to include a set of previous state inputs 306. Previous state inputs 306 may indicate the most recent previous value of state outputs 308. Self-testing module 52 may read previous state inputs 306 (e.g., at the beginning of each processing cycle, periodically, at a defined time interval, etc.) to determine one or more current operating states. In some embodiments, previous state inputs 306 are enumerated value inputs. For example, previous state inputs 306 may be selected from a set of predefined values. In an exemplary embodiment, previous state inputs 306 may include one or more of the following enumerated values: 0=Stabilize, 1=Wait, 2=Check, 3=Available, 4=Not Run, 5=Pass, 6=Warning—Low DSP, 7=Warning—SAT not dropped, 8=Warning—SAT not increased, 9=Warning—BSP not dropped, 10=Warning, 11=Fail—APS On early, 11=Fail—APS Off, 12=Fail—Low Voltage, 13=Fail—Low DSP, 14=Fail—HPS, 15=Fail—Frz, 16=Fail—LPS, 17=Fail—LS, 18=Fail GV Off, 19=Fail—Damper, 20=Fail—SAT Unreliable, 21=Fail—VFD Fault, 22=Fail—Fan Overload, 23=Fail—Low voltage, 24=Fail.

Previous state inputs 306 may be defined by the most recent previous values of state outputs 308. State outputs 308 represent the operating states of various components of BMS 20 at the end of a previous evaluation cycle. For example, the state output "Fan State" may indicate the operating state of a fan of BMS 20. The state outputs "C1 State," "C2 State," "C3 State," and "C4 State" may indicate the operating states of a first compressor of BMS 20 (i.e., C1), a second compressor of BMS 20 (i.e., C2), a third compressor of BMS 20 (i.e., C3), and a fourth compressor of BMS 20 (i.e., C4), respectively. The state outputs "H1 State," "H2 State," and "H3 State" may indicate the operating states of a first heating element of BMS 20 (i.e., H1), a second heating element of BMS 20 (i.e., H2), and a third heating element of BMS 20 (i.e., H3), respectively. The state output "Econ State" may indicate the operating state of an economizer of BMS 20 and the state output "Exhaust State" may indicate the operating state of a power exhaust component of BMS 20.

Self-testing module 52 may determine the values of state outputs 308 during an evaluation cycle of the state-based self-testing procedure. Various components of BMS 20 may have different operating states concurrently. For example, the state output "C1 State" may have the value of "Check" (e.g., indicating that compressor C1 is being tested) while the state output "C2 State" has the value "Available" (e.g., indicating that compressor C2 is available for testing but is not currently being tested). A transition into one of the enumerated operating states provided above may cause the corresponding state output 308 to change.

Still referring to FIG. 3, inputs 302 are shown to include a set of test selection inputs 310. Test selection inputs 310 may be Boolean inputs (e.g., true or false) indicating whether to test the corresponding components of BMS 20. For example, a test selection input of "Fan to test=true" may indicate that a fan component of BMS 20 will be tested in the state-based testing procedure. In various embodiments, test selection inputs 310 may be set by a user (e.g., via a user interface of main control unit 30, via a remote user interface, etc.) or provided to self-testing module 52 as an output of an automated test selection process (e.g., in response to detecting a potential fault in a component of BMS 20).

Still referring to FIG. 3, inputs 302 are shown to include a reset input 312 and a pause input 314. Reset input 312 may be a Boolean input and may be used for testing purposes. A reset input of "Reset=true" may force one or more of state outputs 308 to the "stabilize" state (e.g., 0=Stabilize), thereby resetting the current operating states. Pause input 314 may be a Boolean input and may be used to temporarily pause execution of a current test. A pause input value of "pause=true" may cause self-testing module 52 to hold each of state outputs 308 in the current testing state for the duration of the pause. Pause input 314 may be cancellable (e.g., by setting "pause=false") and/or renewable (e.g., by setting "pause=false" then setting "pause=true").

Inputs 302 are shown to further include a heat type input 316 and a user prompt input 318. Heat type input 316 may be an internal or user-provided input identifying the type of heating installed in BMS 20 (e.g., gas, electric, heat pump, hydronic, etc.). User prompt input 318 may provide self-testing module 52 with an input received via a user interface (e.g., a user prompt) of main control unit 30. In some embodiments, user prompt input 318 is an enumerated input (e.g., no, yes, wait, etc.) indicating a user selection of various options presented to a user via the user interface.

Still referring to FIG. 3, inputs 302 are shown to include sensor inputs 320. Each of sensor inputs 320 may be a function of one or more of sensor values measured by measurement devices 42-43. For example, sensor inputs 320 may include switch inputs, pressure sensor inputs, temperature sensor inputs, flow sensor inputs, voltage sensor inputs, humidity sensor inputs, and/or other types of inputs capable of measurement by measurement devices 42-43. Sensor inputs 320 may be floating inputs (e.g., a measured value from a pressure sensor or a temperature sensor), Boolean inputs, or enumerated inputs. The value of a Boolean input or enumerated input may be a function of one or more measured values. For example, the value of the "Air Proving Switch (APS)" input may be set to either zero (i.e., APS=0) if the corresponding air proving switch is open or to one (i.e., APS=1) if the corresponding air proving switch is closed. Sensor inputs 320 may be set to an enumerated value (e.g., 0=Normal, 1=Alarm, 2=Warning, etc.) based on the values observed by one or more of measurement devices 42-43. For example, the value of an enumerated sensor input 320 may be set to "0=Normal" if the value measured by a corresponding sensor is within a first range of measured values, to "1=Alarm" if the measured value is within a second range of measured values, and to "2=Warning" if the measured value is within a third range of measured values.

Still referring to FIG. 3, outputs 304 are shown to include a state output 322 and a current state status 324. State output 322 may be an enumerated value output indicating the current operating state of self-testing module 52. For example, state output 322 may output one of the following enumerated values depending on which test (if any) is currently being performed: 0=Off, 1=Test Fan, 2=Test C1, 3=Test C2, 4=Test C3, 5=Test C4, 6=Test H1, 7=Test H2, 8=Test H3, 9=Test Econ, 10=Test Exhaust.

Current state status 324 may output the status or result of the test indicated by state output 322. In some embodiments, current state status 324 is an enumerated value output selected from the following enumerated values: 0=Stabilize, 1=Wait, 2=Check, 3=Available, 4=Not Run, 5=Pass, 6=Warning, 7=Fail. In some embodiments, state output 322 and current state status 324 are provided to a user interface for presentation to a user. For example, one portion of the user interface may display the output from state output 322 and another portion of the user interface may display the output from current state status 324. Current state status 324 may be used in combination with state output 322 to report the status or result of the current test.

Still referring to FIG. 3, outputs 308 are shown to include control outputs 326. Control outputs 326 may be provided to auxiliary controllers 32-40 and/or control devices 44-45 to exercise various components of BMS 20 in the state-based testing procedure. In some embodiments, each of control outputs 326 is provided to a particular component of BMS 20 to trigger the testing thereof. For example, the control output "Test Fan" may be provided to a fan component of BMS 20 (e.g., a fan, a fan controller, etc.) to trigger a fan test. In some embodiments, control outputs 326 are used to control operation of the corresponding components of BMS 20. For example, the control output "Test C1" may be provided to a first compressor of BMS 20 (i.e., compressor "C1") to activate the compressor in the "Test C1" operating state.

Still referring to FIG. 3, outputs 308 are shown to include a state table output 328. State table output 328 may be used to provide a state table output for each test performed by self-testing module 52. In some embodiments, state table output 328 records or stores one or more output states from each test. State table output 328 may provide one or more output states from each test to a user interface, a data communications interface, or a memory device to facilitate communication and/or recordation of the testing results.

Figure 4A:
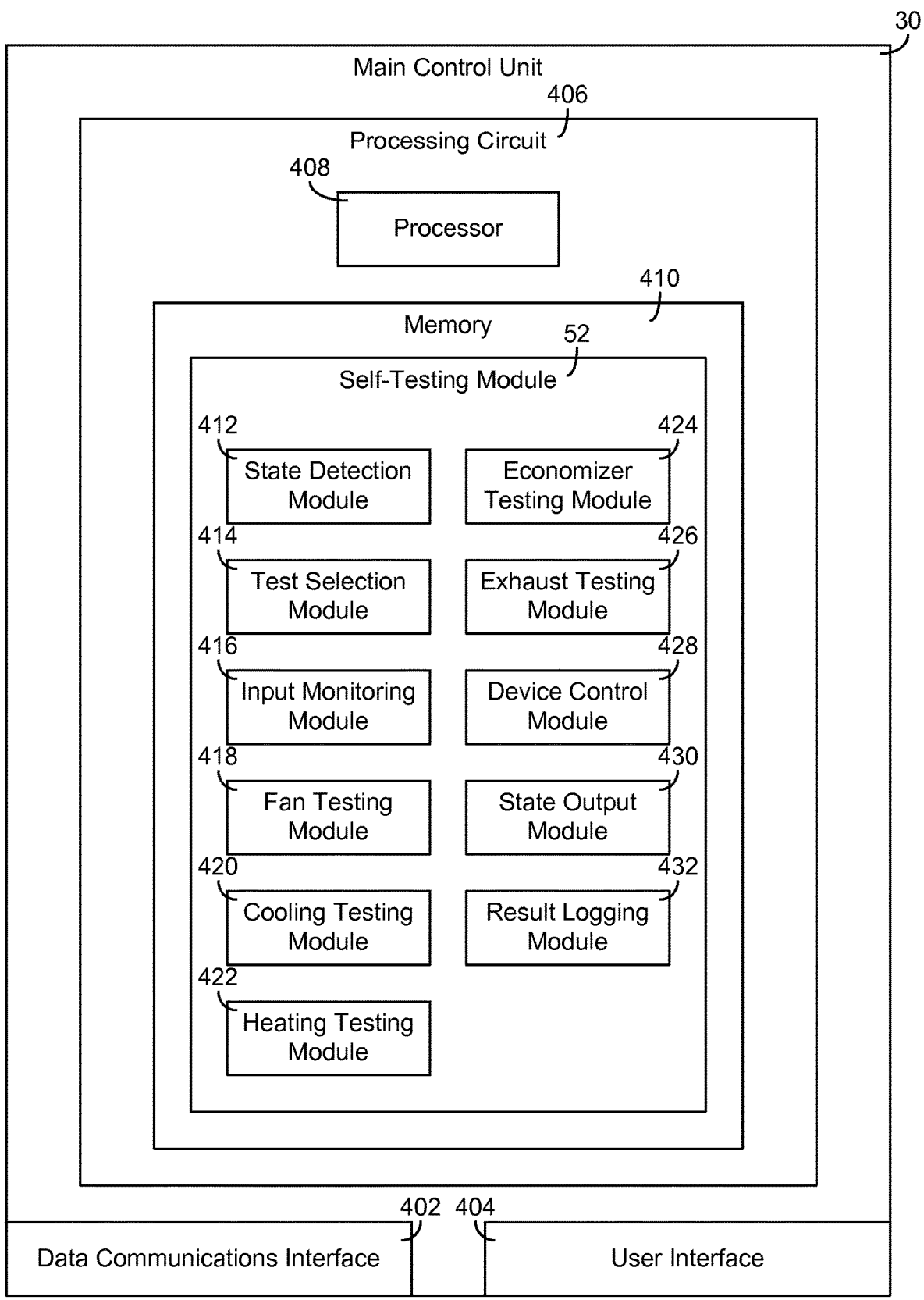
FIG. 4A is a block diagram illustrating the control unit of FIG. 2 in greater detail, showing various memory modules within the self-testing module for performing the state-based testing procedure of the building equipment, according to an exemplary embodiment.

Referring now to FIG. 4A, a block diagram illustrating main control unit 30 in greater detail is shown, according to an exemplary embodiment. Main control unit 30 is shown to include a data communications interface 402, a user interface 404, and a processing circuit 406.

Data communications interface 402 may include wired or wireless interfaces (e.g., jacks, antennas, transmitters, receivers, transceivers, wire terminals, etc.) for conducting electronic data communications with one or more components of BMS 20 and/or external devices or data sources. For example, communications interface 402 may allow main control unit 30 to communicate with measurement devices 42-43, control devices 44-45, auxiliary control units 32-40, and/or communications network 50. In some embodiments, data communications interface 402 includes a BACnet SA bus for conducting data communications using the BACnet protocol. Data communications may be conducted via a direct connection (e.g., a wired connection, an ad-hoc wireless connection, etc.) or a network connection (e.g., an Internet connection, a LAN, WAN, or WLAN connection, etc.). For example, data communications interface 402 can include an Ethernet card and port for sending and receiving data via an Ethernet-based communications link or network. In another example, data communications interface 402 can include a WiFi transceiver or a cellular or mobile phone transceiver for communicating via a wireless communications network.

Still referring to FIG. 4A, main control unit 30 is shown to include a user interface 404. User interface 404 may be an onboard (e.g., local) user interface for main control unit 30. User interface 404 may include a user input device (e.g., a pushbutton, a joystick, a keyboard, a dial, a mouse, a microphone, a touch-sensitive display, etc.) capable of converting a user input (e.g., a selection) into an electronic signal or command for main control unit 30. User interface 404 may further include an output device (e.g., an electronic display, a monitor, a speaker, etc.) capable of converting an electronic signal into one or more forms of sensory data for presentation to a user. In some embodiments, user interface 404 may be a remote user interface provided via communications network 50.

User interface 404 may be used to initiate and control the self-testing process. For example, user interface 404 may display a menu of available options for a user to select or confirm to advance the state-based testing procedure. Available options may include, for example, a "begin test" menu option, a "view results" menu option, a "pause" menu option, and/or a "reset" menu option. A user may select one of the available menu options to initiate the testing process or to view the testing status/results. In some embodiments, user interface 404 includes at least two lines of text. During testing, user interface 404 may display the output from state output 322 (e.g., in the first line of text) and the output from current state status 324 (e.g., in the second line of text).

User interface 404 may provide inputs to test selection inputs 310 (e.g., to facilitate a user selection of one or more tests to perform), reset input 312 (e.g., to send a reset command), pause input 314 (e.g., to send a pause command), heat type input 316 (e.g., to facilitate a user selection of a heating type), and/or user prompt 318 (e.g., to facilitate menu navigation, selection, and confirmation of various menu options). During the state-based testing procedure, user interface 404 may prompt a user for input. For example, user interface 404 may prompt a user to select or confirm a heating type or a fan type. In the fan testing state, user interface 404 may prompt a user to input whether a fan is operating. In the economizer testing state, user interface 404 may prompt a user to input whether an economizer damper is open. Inputs received via user interface 404 may be used by self-testing module 52 as inputs which trigger transitions between various testing states.

Still referring to FIG. 4A, main control unit 30 is shown to include a processing circuit 406. processing circuit 406 is shown to include a processor 408 and memory 410. Processor 408 can be implemented as a general purpose processor, an application specific integrated circuit (ASIC), one or more field programmable gate arrays (FPGAs), a group of processing components, or other suitable electronic processing components.

Memory 410 (e.g., memory device, memory unit, storage device, etc.) is one or more devices (e.g., RAM, ROM, solid state memory, hard disk storage, etc.) for storing data and/or computer code for completing or facilitating the various processes, layers and modules described in the present application. Memory 410 may include volatile memory or non-volatile memory. Memory 410 may include database components, object code components, script components, or any other type of information structure for supporting the various activities and information structures described in the present application. According to an exemplary embodiment, memory 410 is communicably connected to processor 408 via processing circuit 406 and includes computer code for executing (e.g., by processing circuit 406 and/or processor 408) one or more processes described herein. Memory 410 is shown to include self-testing module 52. Self-testing module 52 is shown to include a state detection module 412, a test selection module 414, an input monitoring module 416, a fan testing module 418, a cooling testing module 420, a heating testing module 422, an economizer testing module 424, an exhaust testing module 426, a device control module 428, a state output module 430, and a result logging module 432.

Still referring to FIG. 4A, self-testing module 52 is shown to include a state detection module 412. State detection module 412 may be configured to determine the current input state or states for self-testing module 52. State detection module 412 may monitor previous state inputs 306 to determine the most recent previous state for each test (e.g., "Fan State," "C1 State," "C2 State," "C3 State," "C4 State," "H1 State," "H2 State," "H3 State," "Econ State," and "Exhaust State"). State detection module 412 may use previous state inputs 306 to set the current operating state for each of the various tests at the beginning of each evaluation cycle.

In some embodiments, state detection module 412 sets the current operating state for each test to the enumerated value provided by previous state inputs 306 (e.g., 0=Stabilize, 1=Wait, 2=Check, 3=Available, 4=Not Run, 5=Pass, 6=Warning—Low DSP, 7=Warning—SAT not dropped, 8=Warning—SAT not increased, 9=Warning—BSP not dropped, 10=Warning, 11=Fail—APS On early, 11=Fail—APS Off, 12=Fail—Low Voltage, 13=Fail—Low DSP, 14=Fail—HPS, 15=Fail—Frz, 16=Fail—LPS, 17=Fail—LS, 18=Fail GV Off, 19=Fail—Damper, 20=Fail—SAT Unreliable, 21=Fail—VFD Fault, 22=Fail—Fan Overload, 23=Fail—Low voltage, 24=Fail). Previous state inputs 306 may be defined by the most recent previous values of state outputs 308. State outputs 308 represent the operating states of various components of BMS 20 at the end of a previous evaluation cycle. For example, the state output "Fan State" may indicate the operating state of a fan of BMS 20. The state outputs "C1 State," "C2 State," "C3 State," and "C4 State" may indicate the operating states of a first compressor of BMS 20 (i.e., C1), a second compressor of BMS 20 (i.e., C2), a third compressor of BMS 20 (i.e., C3), and a fourth compressor of BMS 20 (i.e., C4), respectively. The state outputs "H1 State," "H2 State," and "H3 State" may indicate the operating states of a first heating element of BMS 20 (i.e., H1), a second heating element of BMS 20 (i.e., H2), and a third heating element of BMS 20 (i.e., H3), respectively. The state output "Econ State" may indicate the operating state of an economizer of BMS 20 and the state output "Exhaust State" may indicate the operating state of a power exhaust component of BMS 20.

In some embodiments, each test may have a different or independent operating state. For example, "C1 State" may be independent from "H1 State." As another example, "H1 State" may be independent from "H2 State." State detection module 412 may provide the current fan testing state (e.g., "Fan State") to fan testing module 418, the current cooling testing states (e.g., "C1 State," "C2 State," "C3 State," and "C4 State") to cooling testing module 420, the current heating testing states (e.g., "H1 State," "H2 State," and "H3 State") to heating testing module 422, the current economizer testing state (e.g., "Econ State") to economizer testing module 424, and the current exhaust testing state (e.g., "Exhaust State") to exhaust testing module 426. Testing modules 418-426 may use the current state provided by state detection module 412 as an initial state for each evaluation cycle.

Still referring to FIG. 4A, self-testing module 52 is shown to include a test selection module 414. Test selection module 414 may be configured to determine which of a plurality of tests to perform during the self-testing procedure. In some embodiments, test selection module 414 determines which of the plurality of tests are capable of being performed for a particular BMS installation. Test selection module 414 may determine whether the devices corresponding to each of the various tests are available for testing. For example, test selection module 414 may determine whether BMS 20 includes a fan system, a cooling system, a heating system, an economizer system, and/or a power exhaust system. If a cooling system is available for testing, test selection module 414 may determine a number of compressors/chillers which can be tested (e.g., C1-C4). If a heating system is available for testing, test selection module 414 may determine a number of heating elements which can be tested (e.g., H1-H3). If a BMS component is present in BMS 20 and a test of the component is not currently in progress, test selection module 414 may initialize the corresponding state to "Available" to indicate that the component is available for testing. If a BMS component is not present in BMS 20, test selection module 414 may set the corresponding state to "Not Run" to indicate that the component cannot be tested.

In some embodiments, test selection module 414 monitors test selection inputs 310 to determine which tests to perform. Test selection inputs 310 may be set by a user (e.g., via a user interface of main control unit 30, via a remote user interface, etc.) or provided to self-testing module 52 as an output of an automated test selection process (e.g., in response to detecting a potential fault in a component of BMS 20). Test selection inputs 310 may be Boolean inputs (e.g., true or false) indicating whether to test a particular component of BMS 20. In some embodiments, test selection module 414 uses the values of test selection inputs 310 to determine which tests to perform. For example, if a BMS component is available in BMS 20 (e.g., C1 State=Available) and the corresponding test selection input indicates that the component should be tested (e.g., C1 to Test=True), test selection module 414 may set the corresponding state to "Check" or "Stabilize" to initiate testing of the BMS component.

Test selection module 414 may control an order or sequence in which the tests of the BMS components are performed. BMS components may be tested sequentially and/or concurrently. In some embodiments, test selection module 414 causes a fan system of BMS 20 to be tested prior to other systems of BMS 20 (e.g., a cooling system, a heating system, an economizer system, an exhaust system, etc.). Test selection module 414 may control the value of state output 322. For example, test selection module 414 may set state output 322 to one of the following enumerated values to initiate testing of the corresponding BMS component: 0=Off, 1=Test Fan, 2=Test C1, 3=Test C2, 4=Test C3, 5=Test C4, 6=Test H1, 7=Test H2, 8=Test H3, 9=Test Econ, 10=Test Exhaust.

Test selection module 414 may access a command hierarchy to determine a testing sequence. The command hierarchy may provide one or more prerequisites for performing each BMS component test. For example, the command hierarchy may provide that a successful completion of the fan system test (e.g., "Fan State In=Pass") is a prerequisite for other BMS component tests. The command hierarchy may define an order in which tests are performed and/or prerequisites for performing each test. An example command hierarchy is described in greater detail with reference to FIG. 4B.

Still referring to FIG. 4A, self-testing module 52 is shown to include an input monitoring module 416. Input monitoring module 416 may be configured to monitor inputs 312-320. For example, input monitoring module 416 may monitor the values of reset input 312, pause input 314, heat type input 316, user prompt 318, and sensor inputs 320. Inputs monitored by input monitoring module 416 may include switch inputs, pressure sensor inputs, temperature sensor inputs, flow sensor inputs, voltage sensor inputs, humidity sensor inputs, and/or other types of inputs capable of measurement by measurement devices 42-43.

In some embodiments, input monitoring module 416 converts one or more of inputs 312-320 to an enumerated value (e.g., 0=Normal, 1=Alarm, 2=Warning, etc.) based on the values observed by one or more of measurement devices 42-43. For example, input monitoring module 416 may convert the value of a sensor input 320 to "0=Normal" if the value is within a first range of values, to "1=Alarm" if the value is within a second range of values, and to "2=Warning" if the value is within a third range of values. Input monitoring module 416 may provide inputs to testing modules 418-426. Testing modules 418-426 may use the inputs provided by input monitoring module 416 as conditions which trigger transitions between operating states.

Still referring to FIG. 4A, self-testing module 52 is shown to include a fan testing module 418. Fan testing module 418 may be configured to test a fan component of BMS 20 using a state-based testing procedure. For example, fan testing module 418 may test an air handling unit (AHU), a variable air volume (VAV) unit, a fixed volume fan, a variable air volume fan, or any other device configured to cause an air flow for BMS 20. In some embodiments, fan testing module 418 tests a fan of a rooftop AHU.

Fan testing module 418 may receive a current fan testing state (e.g., "Fan State=Stabilize") from state detection module 412 and/or test selection module 414. Fan testing module 418 may use the inputs provided by input monitoring module 416 to control state transitions between various fan testing states. For example, fan testing module 418 may receive an input specifying a type of supply fan installed in BMS 20 (e.g., constant volume, variable volume, etc.). If no fan type has been specified, fan testing module 418 may prompt a user to select a fan type or to indicate that the supply fan is running.

In some embodiments, fan testing module 418 receives input from one or more flow sensors and/or pressure sensors (e.g., air proving switches, differential pressure sensors, etc.) of BMS 20 to automatically determine whether air flow is occurring. If the installed fan type is a constant volume fan, fan testing module 418 may determine whether an air proving switch (APS) is open or closed. If the air proving switch is open, fan testing module 418 may transition into a failure state (e.g., "Fail—APS Off") indicating that the airflow is insufficient to close the air proving switch. If the air proving switch is closed, fan testing module 418 may transition into a pass state (e.g., "Pass") indicating that the fan is operating as intended.

If the installed fan type is a variable volume fan, fan testing module 418 may determine whether an input from a duct static pressure (DSP) sensor associated with the fan is above a threshold value. If the DSP sensor value is above the threshold, fan testing module 418 may transition into the pass state. If the DSP sensor value is below the threshold and the air proving switch is closed, fan testing module 418 may transition into a warning state (e.g., "Warning—Low DSP") indicating that the airflow is lower than expected but still sufficient to close the APS. If the DSP sensor value is below the threshold and the air proving switch is open, fan testing module 418 may transition into a failure state (e.g., "Fail—Low DSP") indicating that the DSP sensor value is below the threshold and the airflow (if any) is insufficient to close the APS. An exemplary state transition diagram illustrating the state transitions performed by fan testing module 418 is described in greater detail with reference to FIG. 5.

Still referring to FIG. 4A, self-testing module 52 is shown to include a cooling testing module 420. Cooling testing module 420 may be configured to test a cooling component of BMS 20 using a state-based testing procedure. For example, cooling testing module 420 may test a chiller, an evaporator, a compressor, a chilled fluid system, a cooling fan, or any other system device configured to provide cooling for BMS 20.

In some embodiments, cooling testing module 420 checks whether the fan test performed by fan testing module 418 has successfully completed before performing the cooling test (e.g., by identifying the fan test state). By checking whether the fan test has successfully completed, cooling testing module 420 can ensure that the results of the cooling test are indicative of the functionality of the cooling components (and not of an upstream fan failure).

Cooling testing module 420 may receive a current cooling testing state (e.g., "C1 State=Stabilize") from state detection module 412 and/or test selection module 414. Cooling testing module 420 may use the inputs provided by input monitoring module 416 to control state transitions between various cooling testing states. For example, cooling testing module 420 may receive input from one or more sensors (e.g., flow sensors, high pressure sensors, low pressure sensors, limit switches, temperature sensors, freeze stats, etc.) of BMS 20 to automatically determine whether the cooling equipment is functioning properly.

In some embodiments, cooling testing module 420 activates a cooling component of BMS 20 and monitors the value of a temperature sensor input associated with the cooling component. For example, cooling testing module 420 may monitor a supply air temperature and/or an evaporator temperature. If the monitored temperature drops below a threshold value, cooling testing module 420 may transition into a pass state (e.g., "Pass") indicating that the cooling component is operating as intended. If the monitored temperature does not drop below the threshold value within a predetermined time period, cooling testing module 420 may transition into a warning state (e.g., "Warning—SAT not dropped") indicating that the cooling component is not operating as intended.

Cooling testing module 420 may perform the cooling test for each of a plurality of cooling components (e.g., a first compressor "C1," a second compressor "C2," a third compressor "C3," and a fourth compressor "C4"). Cooling testing module 420 may perform the cooling tests sequentially, concurrently, or any combination thereof.

During the cooling test, cooling testing module 420 may monitor inputs from a high pressure switch (HPS), a freeze state (FRZ), a low pressure switch (LPS) and/or a limit switch (LS). In some embodiments, one or more of the monitored inputs may be enumerated value inputs having an enumerated value of either "0=Normal" or "1=Alarm." If any of the enumerated value inputs have a value of 1=Alarm during the cooling test, cooling testing module 420 may transition into a specific failure state indicating the specific input having the alarm value. For example, if the high pressure switch has a value of 1=Alarm, cooling testing module 420 may transition into a high pressure switch failure state (e.g., "Fail—HPS") indicating a failure resulting from the high pressure switch.

In various embodiments, the monitored inputs may be enumerated value inputs, Boolean value inputs, floating value inputs, or any other type of inputs. Cooling testing module 420 may compare the values of the monitored inputs with one or more values (e.g., threshold values, expected values, acceptable values, etc.) and transition into various operating states based on a result of the comparison. An exemplary state transition diagram illustrating the state transitions performed by cooling testing module 420 is described in greater detail with reference to FIG. 6.

Still referring to FIG. 4A, self-testing module 52 is shown to include a heating testing module 422. Heating testing module 422 may be configured to test a heating component of BMS 20 using a state-based testing procedure. For example, heating testing module 422 may test a heater, a boiler, a radiator, a condenser, a compressor, a heated fluid system, a heating fan, or any other system device configured to provide heating for BMS 20.

In some embodiments, heating testing module 422 checks whether the fan test performed by fan testing module 418 has successfully completed before performing the heating test (e.g., by identifying the fan test state). By checking whether the fan test has successfully completed, heating testing module 422 can ensure that the results of the heating test are indicative of the functionality of the heating components (and not of an upstream fan failure).

Heating testing module 422 may receive a current heating testing state (e.g., "H1 State=Stabilize") from state detection module 412 and/or test selection module 414. Heating testing module 422 may use the inputs provided by input monitoring module 416 to control state transitions between various heating testing states. For example, heating testing module 422 may receive an input specifying a type of heating system installed in BMS 20 (e.g., gas, electric, heat pump, hydronic, etc.). If no heating type has been specified, heating testing module 422 may prompt a user to select a heating type via user interface 404. Heating testing module 422 may receive input from one or more sensors or control devices (e.g., flow sensors, high pressure sensors, low pressure sensors, limit switches, temperature sensors, gas valves, etc.) of BMS 20 to automatically determine whether the heating equipment is functioning properly.

In some embodiments, heating testing module 422 activates a heating component of BMS 20 and monitors the value of a temperature sensor input associated with the heating component. For example, heating testing module 422 may monitor a supply air temperature and/or an heater temperature. If the monitored temperature increases above a threshold value, heating testing module 422 may transition into a pass state (e.g., "Pass") indicating that the heating component is operating as intended. If the monitored temperature does not increase above the threshold value within a predetermined time period, heating testing module 422 may transition into a warning state (e.g., "Warning—SAT not increased") indicating that the heating component is not operating as intended.

Heating testing module 422 may perform the heating test for each of a plurality of heating components (e.g., a first heating element "H1," a second heating element "H2," a third heating element "C3," etc.). Heating testing module 422 may perform the heating tests sequentially, concurrently, or any combination thereof.

During the heating test, heating testing module 422 may monitor inputs from a high pressure switch (HPS), a gas valve (GV), a low pressure switch (LPS) and/or a limit switch (LS). In some embodiments, one or more of the monitored inputs may be enumerated value inputs (e.g., "Normal," "Alarm," "On," "Off," etc.). If the gas valve input has a value of "0=Off" during the heating test, heating testing module 422 may transition into a failure state (e.g., "Fail GV Off") indicating a failure resulting from the gas valve. If any of the switch inputs have a value of "1=Alarm" during the heating test, heating testing module 422 may transition into a failure state indicating a failure resulting from a specific switch alarm (e.g., "Fail=HPS," "Fail—LPS," "Fail—LS," etc.)

In various embodiments, the monitored inputs may be enumerated value inputs, Boolean value inputs, floating value inputs, or any other type of inputs. Heating testing module 422 may compare the values of the monitored inputs with one or more values (e.g., threshold values, expected values, acceptable values, etc.) and transition into various operating states based on a result of the comparison. An exemplary state transition diagram illustrating the state transitions performed by heating testing module 422 is described in greater detail with reference to FIG. 7.

Still referring to FIG. 4A, self-testing module 52 is shown to include an economizer testing module 424. Economizer testing module 424 may be configured to test an economizer component of BMS 20 using a state-based testing procedure. For example, economizer testing module 424 may test an air handling unit (AHU), a variable air volume (VAV) unit, a fan, a damper, or any other device configured to provide economization functionality for BMS 20. In some embodiments, economizer testing module 424 tests an economizer for a rooftop AHU.

Economizer testing module 424 may receive a current economizer testing state (e.g., "Econ State=Stabilize") from state detection module 412 and/or test selection module 414. Economizer testing module 424 may use the inputs provided by input monitoring module 416 to control state transitions between various economizer testing states. For example, economizer testing module 424 may receive an input from one or more sensors or control devices (e.g., flow sensors, temperature sensors, pressure sensors, dampers, etc.) of BMS 20.

Economizer testing module 424 may activate an economizer component of BMS 20 (e.g., a damper, a fan, etc.) and monitor a sensor input associated with the economizer component. For example, economizer testing module 424 may instruct a damper to open and may monitor a supply air temperature or air flow rate downstream of the damper. If the monitored input (e.g., temperature or pressure) satisfies a state transition condition (e.g., above or below a threshold value), economizer testing module 424 may transition into a pass state (e.g., "Pass").

If the monitored input fails to satisfy the state transition condition within a threshold time period, economizer testing module 424 may prompt a user to indicate whether the economizer component is operating as intended. For example, economizer testing module 424 may prompt a user to indicate whether a damper has opened or whether an economizer fan is operating. If the user input indicates that the economizer component is operating as intended, economizer testing module 424 may transition into the pass state. If the user input indicates that the economizer component is not operating as intended (e.g., damper still closed), economizer testing module 424 may transition into a failure state indicating the cause of the failure (e.g., "Fail—Damper").

In some embodiments, economizer testing module 424 tests an outside air temperature before initiating the economizer test. If the outside air temperature is close to the inside air temperature (e.g., within a threshold difference), economizer testing module 424 may delay the economizer test until a later time. By delaying the economizer test until the outside temperature and the inside temperature are significantly different (e.g., different by an amount exceeding a threshold value), economizer testing module 424 can ensure that the proper functioning of the tested economizer component will result in a difference in supply air temperature. An exemplary state transition diagram illustrating the state transitions performed by economizer testing module 424 is described in greater detail with reference to FIG. 8.

Still referring to FIG. 4A, self-testing module 52 is shown to include an exhaust testing module 426. Exhaust testing module 426 may be configured to test a power exhaust component of BMS 20 using a state-based testing procedure. Exhaust testing module 426 may receive a current economizer testing state (e.g., "Exhaust State=Stabilize") from state detection module 412 and/or test selection module 414. Exhaust testing module 426 may use the inputs provided by input monitoring module 416 to control state transitions between various exhaust testing states. For example, exhaust testing module 426 may receive an input from a building static pressure (BSP) sensor of BMS 20.

Exhaust testing module 426 may activate a power exhaust component of BMS 20 (e.g., a damper, a fan, etc.) and monitor a sensor input associated with the power exhaust component. For example, exhaust testing module 426 may activate a power exhaust driver and monitor a building static pressure. If the monitored pressure drops below a threshold value, exhaust testing module 426 may transition into a pass state (e.g., "Pass"). If the monitored pressure does not drop below the threshold value within a predetermined time period, exhaust testing module 426 may transition into a warning state (e.g., "Warning—BSP not dropped) indicating that the building static pressure has not dropped. An exemplary state transition diagram illustrating the state transitions performed by exhaust testing module 426 is described in greater detail with reference to FIG. 9.

Still referring to FIG. 4A, self-testing module 52 is shown to include a device control module 428. Device control module 428 may be configured to exercise one or more control devices of BMS 20 (e.g., control devices 44-45) during the state-based testing procedure. For example, device control module 428 may exercise a fan, a compressor, an evaporator, a valve, a chiller, a heater, a damper, or any other component of BMS 20. Device control module 428 may exercise the BMS component using a control sequence that differs from normal operation. For example, when a BMS component is in the "Stabilize" state (e.g., "Fan State=Stabilize") device control module 428 may instruct the BMS component to deactivate (e.g., completely turn off, completely close, etc.) for a predetermined time period. Deactivating the BMS component may permit measured inputs to stabilize at deactivated (e.g., baseline) values. Upon expiration of the predetermined time period, device control module 428 may instruct the tested BMS component to activate at a maximum value (e.g., running a fan at maximum speed, running a compressor at maximum power, completely opening a damper, etc.). Activating the BMS component at maximum value may cause an effect of the BMS component to be more readily detected than if the BMS component were activated at an intermediary value (e.g., during normal operation).

Still referring to FIG. 4A, self-testing module 52 is shown to include a state output module 430. State output module 430 may be configured to output a current state of each testing procedure at the end of an evaluation cycle. State output module 430 may interact with testing modules 418-426 to determine the end operating states for "Fan State," "C1 State," "C2 State," "C3 State," "C4 State," "H1 State," "H2 State," "H3 State," "Econ State," and "Exhaust State." The end operating states may be the same as the input operating states (e.g., if no state transition has occurred during the current evaluation cycle) or different from the input operating states (e.g., if a state transition has occurred during the current evaluation cycle).

State output module 430 may set the state values for state outputs 308, state output 322, and/or current state status 324. In various embodiments, state output module 430 may provide output states 308 to auxiliary controllers 32-40, control devices 44-45, a memory/storage device, or another system or process. State output module 430 may provide output state 322 and current state status 324 to user interface 404 for presentation to a user.

Still referring to FIG. 4A, self-testing module 52 is shown to include a result logging module 432. Result logging module 432 may be configured to log (e.g., record, store, provide, output, etc.) the results and/or status of the various tests performed by testing modules 418-426. Advantageously, result logging module 432 may readily obtain the testing status and results by identifying the current operating state for each test. For example, the result of the fan test may be obtained by identifying the current operating state of "Fan State" (e.g., "Fail—APS Off," "Pass," "Fail—Low DSP," etc.).

The current operating state of a test may indicate whether the test is pending (e.g., "Available"), in progress (e.g., "Stabilize," "Check," etc.), not run (e.g., "Not Run") or whether the result of the test is a pass or a failure. If the result of a test is a failure, the specific cause of the failure may be indicated in the current operating state (e.g., "Fail—APS Off"). Result logging module 432 may interact with state output module 430 and/or testing modules 418-426 to identify the current operating state for each test. Result logging module 432 may store the testing results in memory, display the testing results via user interface 404, and/or send the testing results as electronic data communications another system or device (e.g., via data communications interface 402).

Referring now to FIG. 4B, a command hierarchy 450 is shown, according to an exemplary embodiment. Command hierarchy 450 may be used by test selection module 414 to determine an order or sequence in which to test various components of BMS 20. In some embodiments, test selection module 414 uses command hierarchy 450 to determine and set the value of state output 322. The value of state output 322 may be used by self-testing module 52 to initiate testing of a corresponding component of BMS 20. For example, a state output 322 value of "State=Test Fan" may cause self-testing module 52 to initiate testing of a fan component of BMS 20. Command hierarchy 450 defines the value of state output 322 based on the values of previous state inputs 306 and global fault input 330.

Command hierarchy 450 is shown to include a plurality of columns. Each column corresponds to a particular input or output of self-testing module 52, as defined by the column heading. For example, command hierarchy 450 is shown to include a "Global Fault" column corresponding to the value of global fault input 330, a plurality of "State In" columns (e.g., "Fan State In," "C1 State In," etc.) corresponding to the values of previous state inputs 306, and a "State" column corresponding to the value of state output 322. In various embodiments, one or more columns may be added or removed from command hierarchy 450 based on the particular configuration of BMS 20. For example, if BMS 20 does not include an economizer component, the column with heading "Econ State In" may be removed from command hierarchy 450.

Still referring to FIG. 4B, command hierarchy 450 is shown to include a plurality of rows 452-478. Rows 452-478 intersect the plurality of columns to form cells. Each of the cells associated with an input (e.g., global fault input 330 or previous state inputs 306) is shown to include a criterion for evaluating the row in which the cell is located. A cell criterion may be satisfied if the value of the previous state input 306 or global fault input 330 corresponding to the column heading matches the expression provided in the cell. Cell criteria for global fault input 330 are shown to include "True" (satisfied if "Global Fault=True") and "False" (satisfied if "Global Fault=False"). Cell criteria for previous state inputs 306 are shown to include "*" (satisfied for any value of the previous state input corresponding to the column heading), "Not Run" (satisfied if the corresponding state input value equals "Not Run"), "Fail" (satisfied if the corresponding state input value equals "Fail"), "Pass" (satisfied if the corresponding state input value equals "Pass"), "Av" (satisfied if the corresponding state input value equals "Available"), and "!Av" (satisfied if the corresponding state input has any value other than "Available"). If all of the criteria of a row are satisfied, test selection module 414 may set state output 322 to the value shown in the "State" column for the row. In various embodiments, one or more rows may be added or removed from command hierarchy 450 based on the particular configuration of BMS 20. For example, if BMS 20 does not include an economizer component, row 474 may be removed from command hierarchy 450.

Upon initiating the state-based testing procedure, test selection module 414 may evaluate rows 452-478 to determine the value for state output 322. In various embodiments, rows 452-478 may be evaluated sequentially (e.g., from top to bottom) or concurrently. A row may be evaluated by evaluating all of the criteria provided in the row. For example, row 452 may be evaluated by determining whether "Global Fault=True" and whether each of state inputs 306 match the expression "*" (i.e., any value). If all of the criteria in row 452 are satisfied, test selection module 414 may set state output 322 to off (i.e., "State=Off"). Satisfying all of the criteria in row 452 may indicate that a fault has been detected in BMS 20 and the state-based testing procedure will not be performed.

Still referring to FIG. 4B, the criteria provided in row 454 may be satisfied if no global fault has been detected (i.e., "Global Fault=False"), if "Fan State In=Not Run," and if the rest of state inputs 306 have any value. If all of the criteria in row 454 are satisfied, test selection module 414 may set state output 322 to off (i.e., "State=Off"). Satisfying all of the criteria in row 454 may indicate that the fan component of BMS 20 has not been tested and is not available for testing. In some embodiments, a successful test of the fan component is a prerequisite to testing other components of BMS 20. Accordingly, if the fan component cannot be tested, the state-based testing procedure may not be performed.

The criteria provided in row 456 may be satisfied if no global fault has been detected (i.e., "Global Fault=False"), if "Fan State In=Av," and if the rest of state inputs 306 have any value. If all of the criteria in row 456 are satisfied, test selection module 414 may set state output 322 to "State=Test Fan." Satisfying all of the criteria in row 456 may indicate that the fan component of BMS 20 has not been tested but is available for testing. Test selection module 414 may cause the fan component to be tested by setting the value of state output 322 to "Test Fan." The fan test may be performed prior to testing other components of BMS 20.

Still referring to FIG. 4B, the criteria provided in row 458 may be satisfied if no global fault has been detected (i.e., "Global Fault=False"), if "Fan State In=Fail," and if the rest of state inputs 306 have any value. If all of the criteria in row 458 are satisfied, test selection module 414 may set state output 322 to off (i.e., "State=Off"). Satisfying all of the criteria in row 458 may indicate that the fan component of BMS 20 has been tested and that the result of the test was a failure. For embodiments in which a successful test of the fan component is a prerequisite to testing other components of BMS 20, the remainder of the state-based testing procedure may not be performed if the fan test resulted in a failure.

The criteria provided in each of rows 460-478 are shown to include "Global Fault=False" and "Fan State In=Pass." Satisfying these two criteria may indicate that no global fault has been detected and that the fan component of BMS 20 has passed the fan component test. These criteria may be prerequisites for performing the state-based tests of each of the remaining components of BMS 20 (e.g., C1-C4, H1-H3, Econ, and Exhaust).

In some embodiments, the remaining components of BMS 20 may be tested sequentially in the order shown in FIG. 4B (e.g., C1, followed sequentially by C2, C3, C4, H1, H2, H3, Econ, and Exhaust). For example, the criteria provided in row 460 may be satisfied if "C1 State In=Av" and if the rest of state inputs 306 have any value. If all of the criteria in row 460 are satisfied, test selection module 414 may set state output 322 to "State=Test C1," thereby initiating the test of component C1. As the test of component C1 is performed, the value of "C1 State In" may progress from "Available" through one or more intermediate states and settle on a result state (e.g., "Pass," "Fail—LPS", etc.). This process is described in greater detail with reference to FIG. 6. The criteria provided in row 462 may be satisfied if "C1 State In=!Av," if "C2 State In=Av," and if the rest of state inputs 306 have any value. If all of the criteria in row 462 are satisfied, test selection module 414 may set state output 322 to "State=Test C2." Accordingly, the test of component C2 may be initiated once the value of "C1 State In" changes from "Available" to any other value.

As shown in FIG. 4B, each successive component of BMS 20 may be tested once the "State In" value of the preceding component changes from "Available" to another value (i.e., once the previous test has been initiated). In some embodiments, test selection module 414 initializes the "State In" values of previous state inputs 306 to "Available" if the corresponding component is present in BMS 20. A component can be selected or deselected for testing (e.g., by a user) by adjusting the values of state selection inputs 310. For example, if a user sets the value of "C3 to test" to "False," test selection module 414 may initialize the value of "C3 State In" to "Not Run" (or any other value matching the expression "!Av"), thereby causing the C3 component to be skipped in command hierarchy 450.

In some embodiments, command hierarchy 450 may provide that the test of a previous sequential component be completed before initiating the testing of a subsequent sequential component. For example, the expression "!Av" may be replaced in one or more cells of command hierarchy 450 with a value corresponding to a result state of the previous sequential test (e.g., "Pass," "Fail—LPS," etc.). Changing "!Av" to an expression corresponding to a result state may delay the next sequential test until the previous test has transitioned into a result state.

The order in which the components of BMS 20 are tested can be adjusted by changing the order of state outputs 322 in the "State" column of command hierarchy 450 (e.g., swapping the locations of "Test C1" and "Test H1"). In various embodiments, components of BMS 20 can be tested sequentially (in any order) or concurrently. Concurrent tests can be performed by replacing the expression "!Av" in one or more cells of command hierarchy 450 with a more permissive expression (e.g., "*"). For example, each of components C1-C4, H1-H3, Econ, and Exhaust can be tested concurrently upon successful completion of the fan test by replacing the "!Av" expressions in rows 462-476 with "*" expressions.

Still referring to FIG. 4B, the criteria provided in row 478 may be satisfied if all of the previous state inputs 306 have values matching the expression "!Av." Satisfying all of the criteria in row 478 may indicate that no components of BMS 20 are available for testing. The criteria provided in row 478 may be satisfied, for example, once the state-based testing process has been completed. If all of the criteria in row 478 are satisfied, test selection module 414 may set state output 322 to off (i.e., "State=Off").

Figure 5:
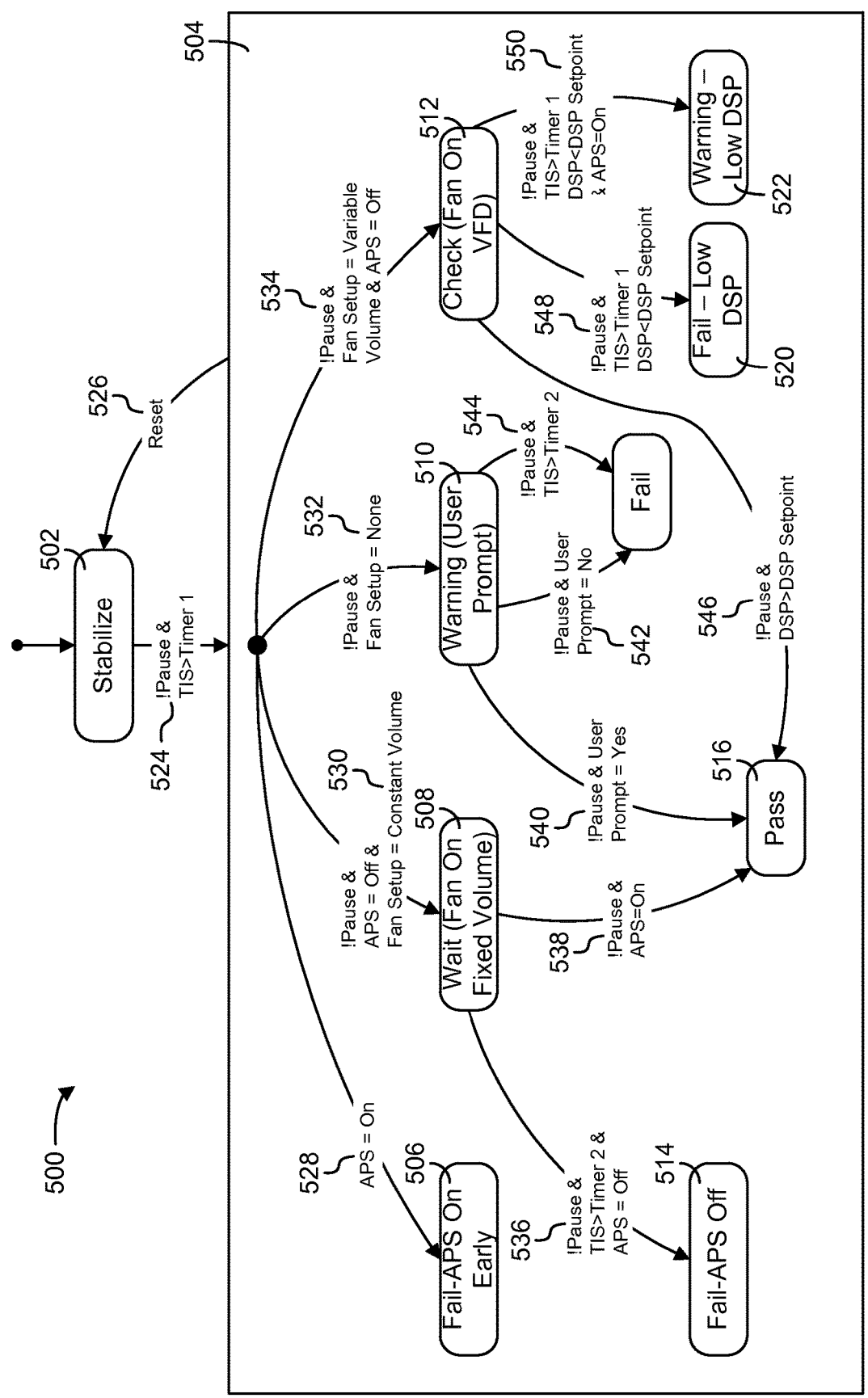
FIG. 5 is a state transition diagram which may be used by the self-testing module of FIG. 2 to perform a state-based diagnostic test of a fan component of the building management system, according to an exemplary embodiment.

Referring now to FIG. 5, a state transition diagram 500 illustrating a state-based fan testing procedure is shown, according to an exemplary embodiment. State transition diagram 500 illustrates various operating states 502-522 and transition conditions 524-550 for transitioning between operating states 502-522. In some embodiments, the state-based fan testing procedure may be performed by fan testing module 418. Fan testing module 418 may receive an input state (e.g., one of operating states 502-522) from state detection module 412. In each operating state, fan testing module 418 may evaluate one or more of transition conditions 524-550 to determine whether to transition into another operating state.

State transition diagram 500 is shown to include a "Stabilize" state 502. Fan testing module 418 may transition into stabilize state 502 in response to an input to initiate the state-based fan testing procedure (e.g., "Fan to test=True" and "State=Test Fan"). In stabilize state 502, fan testing module 418 may deactivate the fan currently being tested. For example, fan testing module 418 may set all Boolean outputs provided to the fan to "Off" and all analog outputs provided to the fan to zero. Fan testing module 418 may remain in stabilize state 502 until the time in state (TIS) exceeds a threshold value (e.g., TIS>Timer 1). When the time in state exceeds the threshold value, fan testing module 418 may transition into testing state 504 (transition condition 524).

In some operating states, pause input 314 may prevent transitioning into another operating state. For example, each of state transitions 524 and 530-550 may require that pause input 314 not be active (i.e., "!Pause," "Pause=False") in order to transition into another operating state. When pause input 314 is active, state transitions 524 and 528-550 may be prevented until the pause timer expires or until pause is cancelled. State transition 526 does not have a pause input requirement and may occur regardless of the value of pause input 314. When reset input 312 is active (e.g., "Reset=True"), fan testing module 418 may transition from testing state 504 to stabilize state 502.

Testing state 504 is shown to include a plurality of sub-states 506-522. Upon entering testing state 504, fan testing module 418 may evaluate transition condition 528. If transition condition 528 is satisfied (i.e., "APS=On"), fan testing module 418 may transition into state 506 (i.e., "Fail—APS On Early"). State 506 may indicate a fault with the air proving switch (APS) because the APS should normally be off (APS=Off) when no airflow is occurring.

Referring again to testing state 504, in state 504, fan testing module 418 may evaluate transition condition 530. If transition condition 530 is satisfied (i.e., "!Pause & APS=Off & Fan Setup=Constant Volume"), fan testing module 418 may transition into state 508 (i.e., "Wait-Fan on Fixed Volume"). State 508 may indicate that the type of fan installed in BMS 20 is a constant volume fan. A transition into state 508 may occur when the type of fan has already been specified (e.g., stored in memory, provided as an input, etc.) and the specified fan type is "Constant Volume."

In state 508, fan testing module 418 may activate the fan at a maximum output (e.g., maximum power, maximum speed, etc.). In state 508, fan testing module 418 may evaluate transition conditions 536 and 538. If transition condition 536 is satisfied (i.e., "!Pause & TIS>Timer 2 & APS=Off"), fan testing module 418 may transition into state 514. A transition into state 514 may occur when the air proving switch remains open (APS=Off) despite the fan being activated for a time exceeding the time threshold "Timer 2." State 514 is shown as a failure state indicating that the result of the fan test is a failure and that the cause of the failure is the APS being off.

Referring again to testing state 504, in state 504, fan testing module 418 may evaluate transition condition 532. If transition condition 532 is satisfied (i.e., "!Pause & Fan Setup=None"), fan testing module 418 may transition into state 510 (i.e., "Warning—User Prompt"). State 510 may indicate that no fan type has been specified. A transition into state 510 may occur when no fan type has been specified (i.e., "Fan Setup=None").

In state 510, fan testing module 418 instruct the fan to activate and prompt a user (e.g., via user interface 404) to input whether the fan is on (i.e., "User Prompt=Yes") or off (i.e., "User Prompt=No). In state 510, fan testing module 418 may evaluate transition conditions 540, 542, and 544. If transition condition 540 is satisfied (i.e., "!Pause & User Prompt=Yes"), fan testing module 418 may transition into state 516. State 516 is shown as a pass state (i.e., "Pass") indicating that the fan is operating as intended.

In state 510, if either of transition conditions 542 (i.e., "!Pause & User Prompt=No"), or 544 (i.e., "!Pause TIS>Timer 2"), are satisfied, fan testing module 418 may transition into state 518. State 518 is shown as a failure state indicating that the fan is not operating as intended. Transition condition 542 may be satisfied when the input received via user interface 404 indicates that the fan is off notwithstanding the previous instruction in state 510 to activate the fan. Transition 544 may be satisfied when the time in state 510 without receiving a user input exceeds a time threshold (i.e. "TIS>Timer 2").

Referring again to testing state 504, in state 504, fan testing module 418 may evaluate transition condition 534. If transition condition 534 is satisfied (i.e., "!Pause & Fan Setup=Variable Volume & APS=Off"), fan testing module 418 may transition into state 512 (i.e., "Check—Fan on VFD"). State 512 may indicate that the type of fan installed in BMS 20 is a variable volume fan. A transition into state 512 may occur when the type of fan has already been specified (e.g., stored in memory, provided as an input, etc.) and the specified fan type is "Variable Volume."

In state 512, fan testing module 418 may activate the fan at a maximum output (e.g., maximum power, maximum speed, maximum volume, etc.). In state 512, fan testing module 418 may evaluate transition conditions 546, 548 and 550. If transition condition 546 is satisfied (i.e., "!Pause & DSP>DSP Setpoint), fan testing module 418 may transition into pass state 516. Transition condition 546 may be satisfied when the input from a duct static pressure (DSP) sensor exceeds a duct static pressure setpoint (i.e., "DSP>DSP Setpoint").

In state 512, if transition condition 548 is satisfied (i.e., "!Pause & TIS>Timer 1 & DSP<DSP Setpoint"), fan testing module may transition into state 520. A transition into state 520 may occur when the DSP remains below the DSP setpoint despite the fan being activated for a time exceeding the time threshold "Timer 1." State 520 is shown as a failure state indicating that the result of the fan test is a failure and that the cause of the failure is a low DSP (i.e., "Fail—Low DSP").

In state 512, if transition condition 550 is satisfied (i.e., "!Pause & TIS>Timer 1 & DSP <DSP Setpoint & APS=On"), fan testing module may transition into state 522. A transition into state 522 may occur when the DSP remains below the DSP setpoint despite the fan being activated for a time exceeding the time threshold "Timer 1" but that the airflow is nonetheless strong enough to close the air proving switch. State 522 is shown as a failure state indicating that the result of the fan test is a warning and that the cause of the warning is a low DSP (i.e., "Warning—Low DSP").

Figure 6:
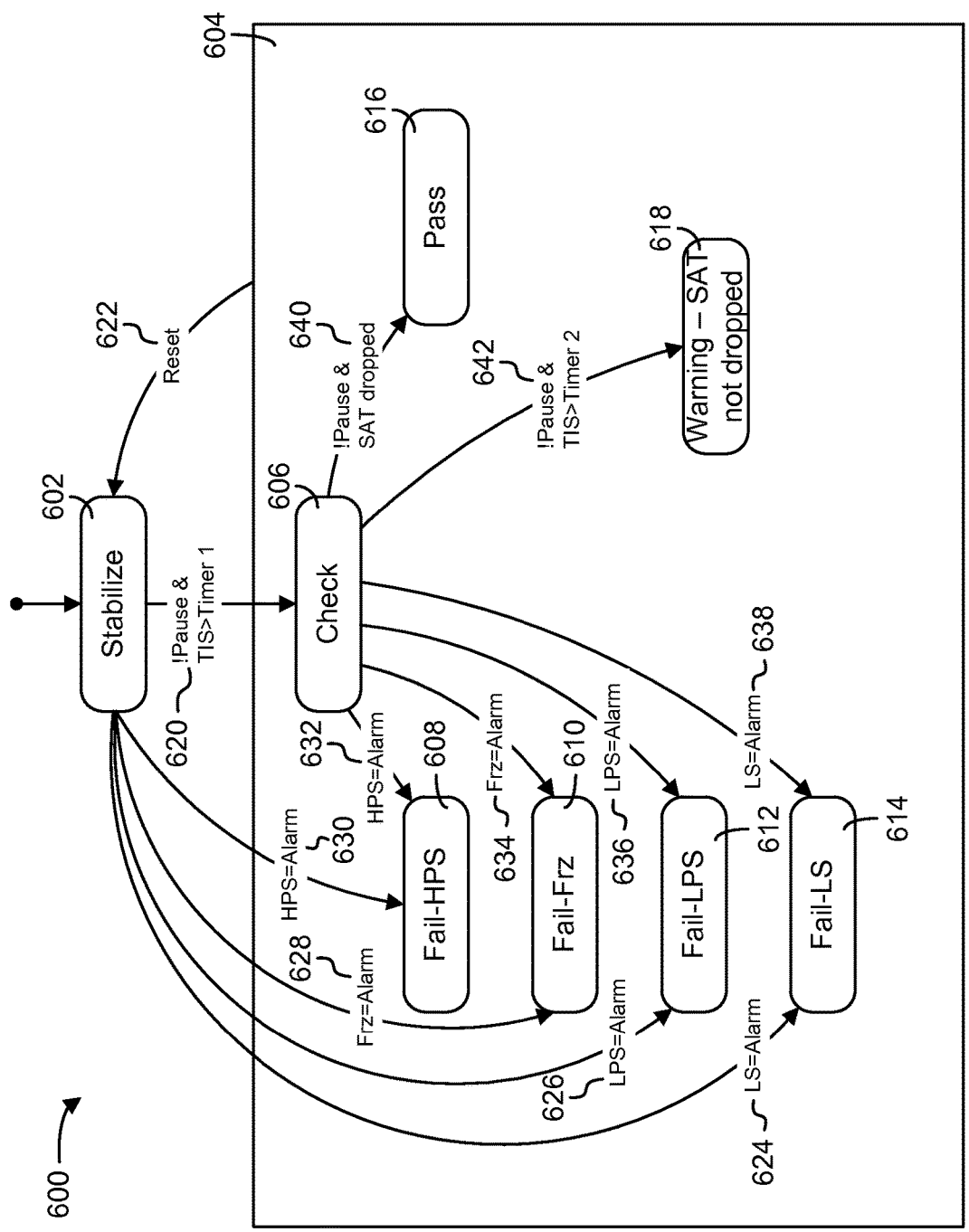
FIG. 6 is a state transition diagram which may be used by the self-testing module of FIG. 2 to perform a state-based diagnostic test of a cooling element of the building management system, according to an exemplary embodiment.

Referring now to FIG. 6, a state transition diagram 600 illustrating a state-based cooling testing procedure is shown, according to an exemplary embodiment. State transition diagram 600 illustrates various operating states 602-618 and transition conditions 620-642 for transitioning between operating states 602-618. In some embodiments, the state-based cooling testing procedure may be performed by cooling testing module 420. In each operating state, cooling testing module 420 may evaluate one or more of transition conditions 620-642 to determine whether to transition into another operating state.

Cooling testing module 420 may perform the state-based cooling testing procedure for one or more cooling elements of BMS 20 (e.g., a first compressor "C1," a second compressor "C2," a third compressor "C3," a fourth compressor "C4," etc.). Cooling testing module 420 may receive an input state (e.g., one of operating states 602-618) from state detection module 412 for each cooling element being tested. In various embodiments, a plurality of cooling elements may be tested sequentially or concurrently. Each cooling element may have a different or independent operating state and each test may be specific to a particular cooling element. In some embodiments, each cooling test uses the states and transition logic provided in state transition diagram 600.

State transition diagram 600 is shown to include a "Stabilize" state 602. Cooling testing module 420 may transition a cooling test (e.g., a test for a particular cooling element C1, C2, C3, C4, etc.) into stabilize state 602 in response to an input to initiate the state-based cooling testing procedure for the cooling element (e.g., "C1 to test=True" and "State=Test C1," "C2 to test=True" and "State=Test C2," "C3 to test=True" and "State=Test C3," or "C4 to test=True" and "State=Test C4"). In stabilize state 602, cooling testing module 420 may deactivate the cooling component currently being tested. For example, cooling testing module 420 may set all Boolean outputs provided to the cooling element to "Off" and all analog outputs provided to the cooling element to zero.

In stabilize state 602, cooling testing module 420 may evaluate transition conditions 624, 626, 628, and 630. If transition condition 624 is satisfied (i.e., "LS=Alarm"), the cooling test may transition into state 614. State 614 is shown as a failure state (i.e., "Fail—LS") indicating that the result of the cooling test is a failure and the cause of the failure is a limit switch (LS) alarm. If transition condition 626 is satisfied (i.e., "LPS=Alarm"), the cooling test may transition into state 612. State 612 is shown as a failure state (i.e., "Fail—LPS") indicating that the result of the cooling test is a failure and the cause of the failure is a low pressure switch (LPS) alarm. If transition condition 628 is satisfied (i.e., "FRZ=Alarm"), the cooling test may transition into state 610. State 610 is shown as a failure state (i.e., "Fail—Frz") indicating that the result of the cooling test is a failure and the cause of the failure is a freeze stat (FRZ) alarm. If transition condition 630 is satisfied (i.e., "HPS=Alarm"), the cooling test may transition into state 608. State 608 is shown as a failure state (i.e., "Fail—HPS") indicating that the result of the cooling test is a failure and the cause of the failure is a high pressure switch (HPS) alarm.

In stabilize state 602, cooling testing module 420 may evaluate transition condition 620. If transition condition 620 is satisfied, the cooling test may transition into check state 606. Transition condition 620 may be satisfied when the time in state 602 (TIS) exceeds a threshold value (e.g., "TIS>Timer 1").

In some operating states, pause input 314 may prevent transitioning into another operating state. For example, each of state transitions 620, 640, and 642 may require that pause input 314 not be active (i.e., "!Pause," "Pause=False") in order to transition into another operating state. When pause input 314 is active, state transitions 620, 640, and 642 may be prevented until the pause timer expires or until pause is cancelled. State transitions 622-638 do not have a pause input requirement and may occur regardless of the value of pause input 314. When reset input 312 is active (e.g., "Reset=True," transition condition 622), cooling testing module 420 may transition the cooling test from testing state 604 to stabilize state 602.

Testing state 604 is shown to include a plurality of sub-states 606-618. When transition condition 620 is satisfied, the testing procedure may transition into check state 606. In check state 606, cooling testing module 420 may activate the cooling element being tested. In check state 606, cooling testing module 420 may evaluate transition conditions 632-638. If transition condition 632 is satisfied (i.e., "HPS=Alarm"), the cooling test may transition into state 608. If transition condition 634 is satisfied (i.e., "FRZ=Alarm"), the cooling test may transition into state 610. If transition condition 636 is satisfied (i.e., "LPS=Alarm"), the cooling test may transition into state 612. If transition condition 638 is satisfied (i.e., "LS=Alarm"), the cooling test may transition into state 614.

In check state 606, cooling testing module may evaluate transition conditions 640 and 642. If transition condition 640 is satisfied (i.e., "!Pause & SAT=Dropped"), cooling testing module 420 may transition the cooling test into state 616 (i.e., "Pass"). State 616 is shown as a pass state indicating that the supply air temperature (SAT) has dropped as a result of activating the cooling component. If transition condition 642 is satisfied (i.e., "!Pause & TIS>Timer 2"), the cooling test may transition into state 618. State 618 is shown as a warning state (i.e., "Warning—SAT not dropped") indicating that the supply air temperature has not dropped in response to activating the cooling element before expiration of the timer "Timer 2."

In an exemplary embodiment, transition condition 640 may require that a measured temperature associated with the cooling element (e.g., a supply air temperature, an evaporator temperature, a chiller fluid temperature, etc.) be less than a threshold value. The threshold value may be a predetermined value or a calculated value (e.g., based on an initial temperature value measured at the beginning of check state 606). For example, transition condition 640 may require that a measured temperature decrease by a predetermined number of degrees or to a percentage of the initial measured value in response to activating the cooling element.

Figure 7:
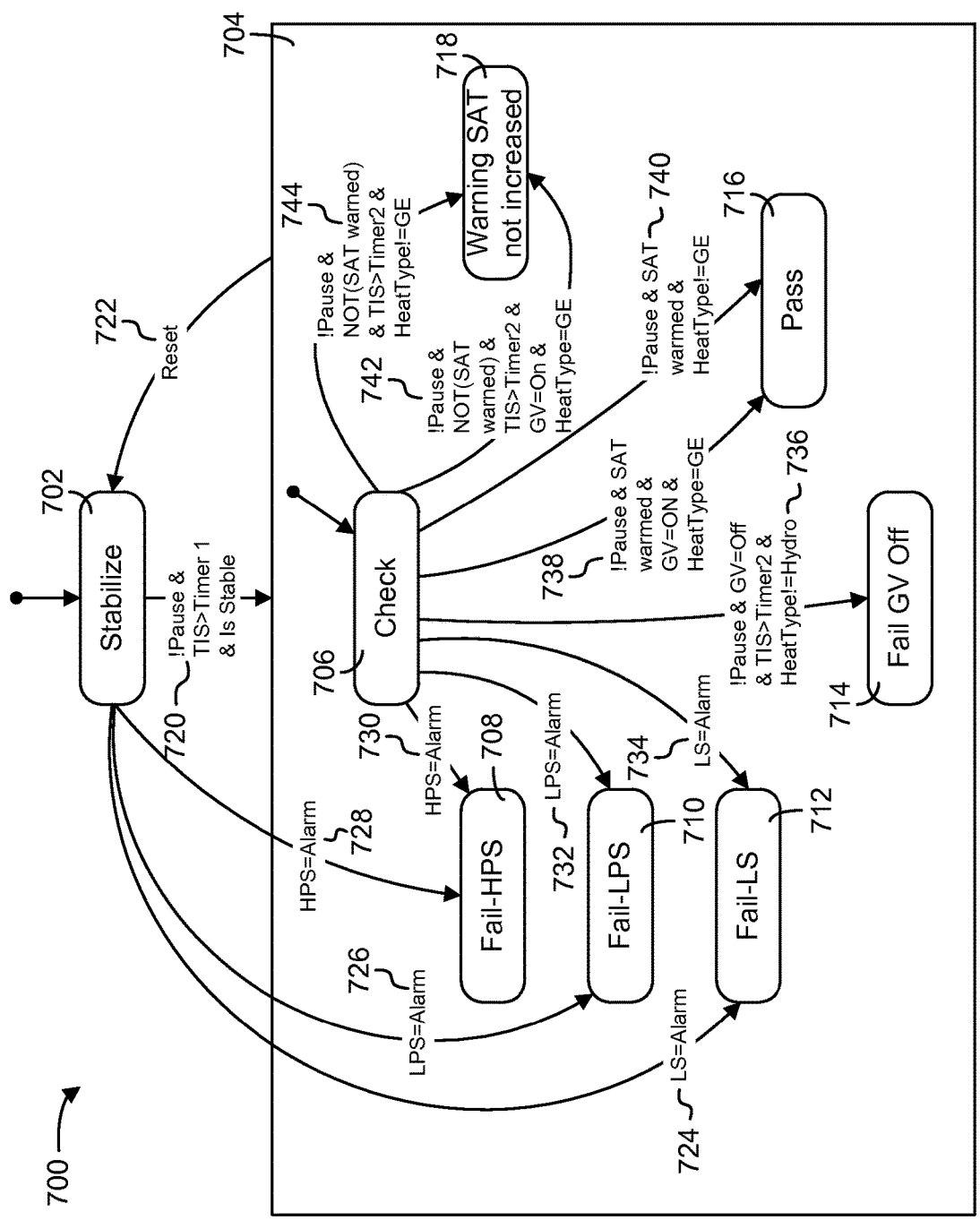
FIG. 7 is a state transition diagram which may be used by the self-testing module of FIG. 2 to perform a state-based diagnostic test of a heating element of the building management system, according to an exemplary embodiment.

Referring now to FIG. 7, a state transition diagram 700 illustrating a state-based heating testing procedure is shown, according to an exemplary embodiment. State transition diagram 700 illustrates various operating states 702-718 and transition conditions 720-744 for transitioning between operating states 702-718. In some embodiments, the state-based heating testing procedure may be performed by heating testing module 422. In each operating state, heating testing module 422 may evaluate one or more of transition conditions 720-744 to determine whether to transition into another operating state.

Heating testing module 422 may perform the state-based heating testing procedure for one or more heating elements of BMS 20 (e.g., a first heating element "H1," a second heating element "H2," a third heating element "H3," etc.). Heating testing module 422 may receive an input state (e.g., one of operating states 702-718) from state detection module 412 for each heating element being tested. In various embodiments, a plurality of heating elements may be tested sequentially or concurrently. Each heating element may have a different or independent operating state and each test may be specific to a particular heating element. In some embodiments, each heating test uses the states and transition logic provided in state transition diagram 700.

State transition diagram 700 is shown to include a "Stabilize" state 702. Heating testing module 422 may transition a heating test (e.g., a test for a particular cooling element H1, H2, H3, etc.) into stabilize state 702 in response to an input to initiate the state-based heating testing procedure for the heating element (e.g., "H1 to test=True" and "State=Test H1," "H2 to test=True" and "State=Test H2," or "H3 to test=True and "State=Test H3"). In stabilize state 702, heating testing module 422 may deactivate the heating element currently being tested. For example, heating testing module 422 may set all Boolean outputs provided to the heating element to "Off" and all analog outputs provided to the heating element to zero.

In stabilize state 702, heating testing module 422 may evaluate transition conditions 724, 726, and 728. If transition condition 724 is satisfied (i.e., "LS=Alarm"), the heating test may transition into state 712. State 712 is shown as a failure state (i.e., "Fail—LS") indicating that the result of the heating test is a failure and the cause of the failure is a limit switch (LS) alarm. If transition condition 726 is satisfied (i.e., "LPS=Alarm"), the heating test may transition into state 710. State 710 is shown as a failure state (i.e., "Fail—LPS") indicating that the result of the heating test is a failure and the cause of the failure is a low pressure switch (LPS) alarm. If transition condition 728 is satisfied (i.e., "HPS=Alarm"), the heating test may transition into state 708. State 708 is shown as a failure state (i.e., "Fail—HPS") indicating that the result of the heating test is a failure and the cause of the failure is a high pressure switch (HPS) alarm.

In stabilize state 702, heating testing module 422 may evaluate transition condition 720. If transition condition 720 is satisfied, the heating test may transition into check state 706. Transition condition 720 may be satisfied when the temperature associated with the heating element currently being tested is stable (i.e., "Is Stable=True") and the time in state 702 (TIS) exceeds a threshold value (e.g., "TIS>Timer 1").

In some operating states, pause input 314 may prevent transitioning into another operating state. For example, each of state transitions 720 and 736-744 may require that pause input 314 not be active (i.e., "!Pause," "Pause=False") in order to transition into another operating state. When pause input 314 is active, state transitions 720 and 736-744 may be prevented until the pause timer expires or until pause is cancelled. State transitions 722-734 do not have a pause input requirement and may occur regardless of the value of pause input 314. When reset input 312 is active (e.g., "Reset=True," transition condition 722), heating testing module 422 may transition the heating test from testing state 704 to stabilize state 702.

Testing state 704 is shown to include a plurality of sub-states 706-718. When transition condition 720 is satisfied, the testing procedure may transition into check state 706. In check state 706, heating testing module 422 may activate the heating element being tested. Activating a heating element may include, for example, opening a gas valve, providing power to an electric heater, activating a heat pump, or otherwise activating a component configured to provide heating for BMS 20.

In check state 706, heating testing module 422 may evaluate transition conditions 730-734. If transition condition 730 is satisfied (i.e., "HPS=Alarm"), the heating test may transition into failure state 708 (i.e., "Fail—HPS). If transition condition 732 is satisfied (i.e., "LPS=Alarm"), the heating test may transition into failure state 710 (i.e., Fail—LPS). If transition condition 734 is satisfied (i.e., "LS=Alarm"), the cooling test may transition into failure state 712 (i.e., "Fail—LS).

In check state 706, heating testing module 422 may evaluate transition condition 736. If transition condition 736 is satisfied (i.e., "!Pause & GV=Off & TIS>Timer 2 & Heat Type !=Hydro"), heating testing module 422 may transition the heating test into state 714. State 714 is shown as a failure state (i.e., "Fail—GV Off) indicating that a gas valve (GV) has failed to open within a time window (i.e., Timer 2) after entering check state 706. Transition condition 736 may be satisfied if the heating type is any type other than hydronic heating.

In check state 706, heating testing module 422 may evaluate transition conditions 738 and 740. If transition condition 738 is satisfied (i.e., "!Pause & SAT warmed & GV=On & Heat Type=GE") or transition condition 740 is satisfied (i.e., "!Pause & SAT warmed & Heat Type=!GE"), the, the heating test may transition into state 716. State 716 is shown as a pass state (i.e., "Pass") indicating that the supply air temperature has increased in response to activating the heating element. Transition condition 738 may be satisfied if the gas valve is open, the heating type is either gas or electric (GE), and the Boolean input "SAT warmed" is true. Transition condition 740 may be satisfied if the Boolean input "SAT warmed" is true and the heat type is anything other than gas or electric.

In an exemplary embodiment, transition conditions 738 and 740 may require that a measured temperature associated with the heating element (e.g., a supply air temperature, an heater temperature, a heating fluid temperature, etc.) be greater than a threshold value. The threshold value may be a predetermined value or a calculated value (e.g., based on an initial temperature value measured at the beginning of check state 706). For example, transition conditions 738 and 740 may require that a measured temperature increase by a predetermined number of degrees or to a percentage of the initial measured value in response to activating the heating element.

In check state 706, heating testing module 422 may evaluate transition conditions 742 and 744. If transition condition 742 is satisfied (i.e., "!Pause & NOT (SAT warmed) & TIS>Timer 2 & GV=On & Heat Type=GE") or transition condition 744 is satisfied (i.e., "!Pause & NOT (SAT warmed) & TIS>Timer 2 & Heat Type !=GE"), the heating test may transition into state 718. State 718 is shown as a warning state (i.e., "Warning—SAT not increased") indicating that the supply air temperature has not increased in within the time threshold "Timer 2" response to activating the heating element. Transition condition 742 may be satisfied if the gas valve is open, the heating type is either gas or electric (GE), and the Boolean input "SAT warmed" is false. Transition condition 744 may be satisfied if the Boolean input "SAT warmed" is false and the heat type is anything other than gas or electric.

Figure 8:
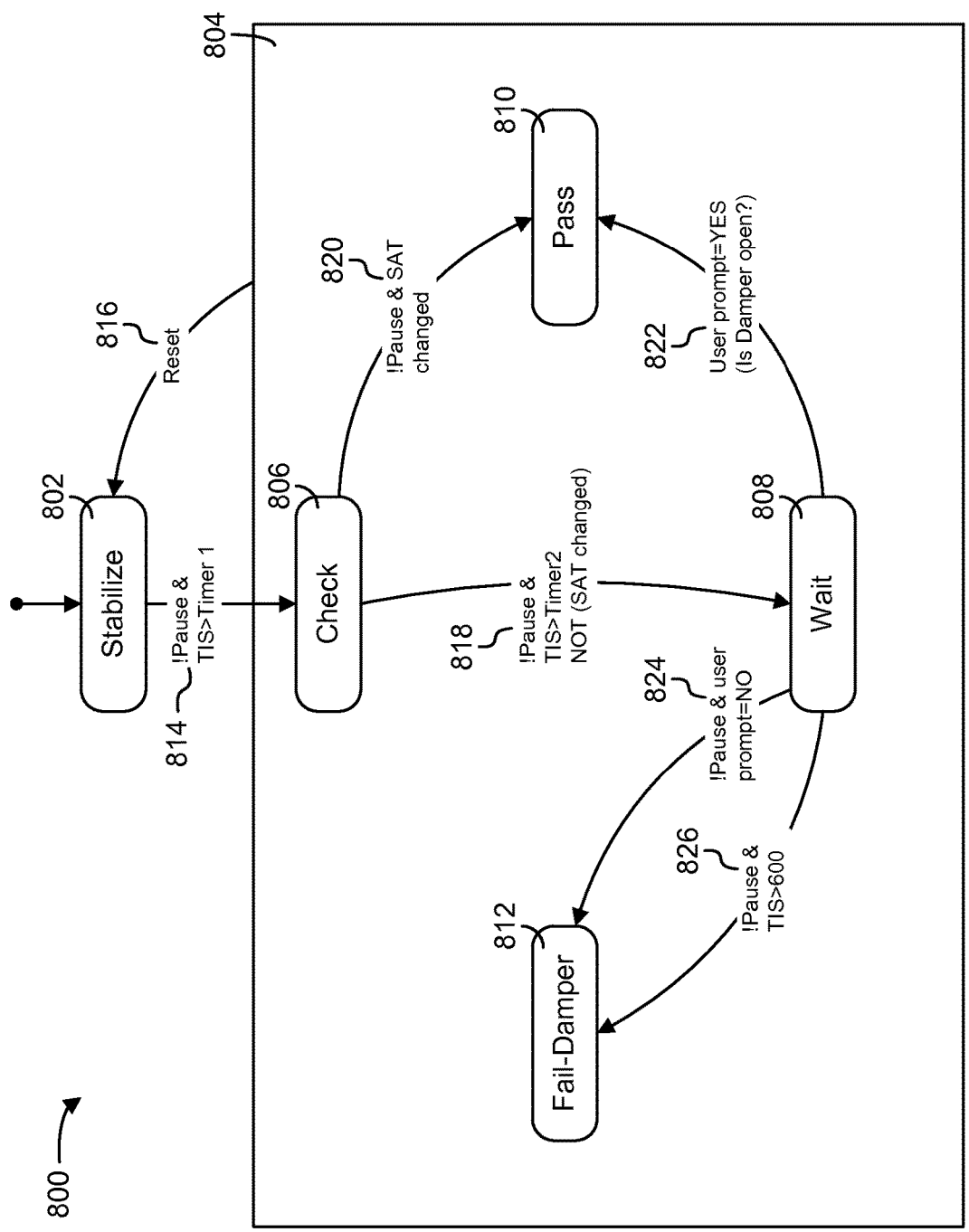
FIG. 8 is a state transition diagram which may be used by the self-testing module of FIG. 2 to perform a state-based diagnostic test of an economizer element of the building management system, according to an exemplary embodiment.

Referring now to FIG. 8, a state transition diagram 800 illustrating a state-based economizer testing procedure is shown, according to an exemplary embodiment. State transition diagram 800 illustrates various operating states 802-812 and transition conditions 814-826 for transitioning between operating states 802-812. In some embodiments, the state-based economizer testing procedure may be performed by economizer testing module 424. Economizer testing module 424 may receive an input state (e.g., one of operating states 802-812) from state detection module 412. In each operating state, economizer testing module 424 may evaluate one or more of transition conditions 814-826 to determine whether to transition into another operating state.

State transition diagram 800 is shown to include a "Stabilize" state 802. Economizer testing module 424 may transition into stabilize state 802 in response to an input to initiate the state-based economizer testing procedure (e.g., "Econ to test=True" and "State=Test Econ"). In stabilize state 802, economizer testing module 424 may deactivate an economizer element of BMS 20. For example, economizer testing module 424 may close a damper associated with the economizer element currently being tested. In stabilize state 802, economizer testing module 424 may evaluate transition condition 814. If transition condition 814 is satisfied, economizer testing module 424 may transition into check state 806. Transition condition 814 may be satisfied when the time in state 802 (TIS) exceeds a threshold value (e.g., "TIS>Timer 1"). In some embodiments, economizer testing module 424 measures a supply air temperature upon satisfaction of transition condition 814 (e.g., at the beginning of check state 806).

In some embodiments, economizer testing module 424 measures an inside air temperature and an outside air temperature before beginning the economizer test (e.g., during or prior to entering stabilize state 802). If the outside air temperature is close to the inside air temperature (e.g., within a threshold difference), economizer testing module 424 may delay the economizer test until a later time. By delaying the economizer test until the outside temperature and the inside temperature are significantly different (e.g., different by an amount exceeding a threshold value), economizer testing module 424 can ensure that the proper functioning of the tested economizer component will result in a difference in supply air temperature.

In some operating states, pause input 314 may prevent transitioning into another operating state. For example, each of state transitions 814, 818-820, and 824-826 may require that pause input 314 not be active (i.e., "!Pause," "Pause=False") in order to transition into another operating state. When pause input 314 is active, state transitions 814, 818-820, and 824-826 may be prevented until the pause timer expires or until pause is cancelled. State transitions 816 and 822 do not have a pause input requirement and may occur regardless of the value of pause input 314. When reset input 312 is active (e.g., "Reset=True," transition condition 816), economizer testing module 424 may transition from testing state 804 to stabilize state 802.

Testing state 804 is shown to include a plurality of sub-states 806-812. When transition condition 814 is satisfied, the testing procedure may transition into check state 806. In check state 806, economizer testing module 424 may activate the economizer element currently being tested. Activating an economizer element may include, for example, opening a damper, providing power to an economizer fan, or otherwise activating a component configured to provide economizer functionality for BMS 20.

In check state 806, economizer testing module 424 may evaluate transition condition. If transition condition 818 is satisfied (i.e., "!Pause & TIS>Timer 2 & NOT(SAT changed)"), economizer testing module 424 may transition into state 808. State 808 is shown as a waiting state. A transition into waiting state 808 may occur when the supply air temperature has not changed within a threshold time window after entering check state 806 and activating the economizer component.

In state 808, economizer testing module 424 may prompt a user for input regarding whether the economizer component has activated successfully. For example, economizer testing module 424 may prompt a user to answer whether an economizer damper is open or closed. From state 808, if user input provides that the economizer damper is open (e.g., "User prompt=Yes," transition condition 822), economizer testing module 424 may transition into pass state 810. Pass state 810 is shown as a pass state indicating that the economizer element is operating as intended. Transition condition 822 may be useful for transitioning into pass state 810 in instances in which the economizer is operating properly but the supply air temperature has not changed by an amount sufficient to trigger "SAT changed" (e.g., if the inside air temperature and outside air temperature are similar).

From state 808, if the user input provides that the economizer damper is closed (e.g., "User prompt=No," transition condition 824), economizer testing module 424 may transition into state 812. State 812 is shown as a failure state indicating that the economizer element being tested is not operating as intended. A transition from state 808 to state 812 may occur in response to an input confirming that the economizer damper has not opened.

Referring again to check state 806, in check state 806, economizer testing module 424 may evaluate transition condition 820. If transition condition 820 is satisfied (i.e., "!Pause & SAT changed"), economizer testing module 424 may transition into pass state 810. A transition from check state 806 into pass state 810 may occur in response to the supply air temperature changing by an amount sufficient to trigger the Boolean input "SAT changed." In check state 706, heating testing module 422 may evaluate transition condition 736.

In an exemplary embodiment, transition conditions 818 and 820 may require that a measured input associated with the economizer element (e.g., a supply air temperature, an air flow rate, a pressure, etc.) change by an amount exceeding a threshold value. The threshold value may be a predetermined value or a calculated value (e.g., based on an initial measurement collected at the beginning of check state 806). For example, transition conditions 818 and 820 may require that a measured temperature change by a predetermined number of degrees or to a percentage of the initial measured value in response to activating the economizer element.

Figure 9:
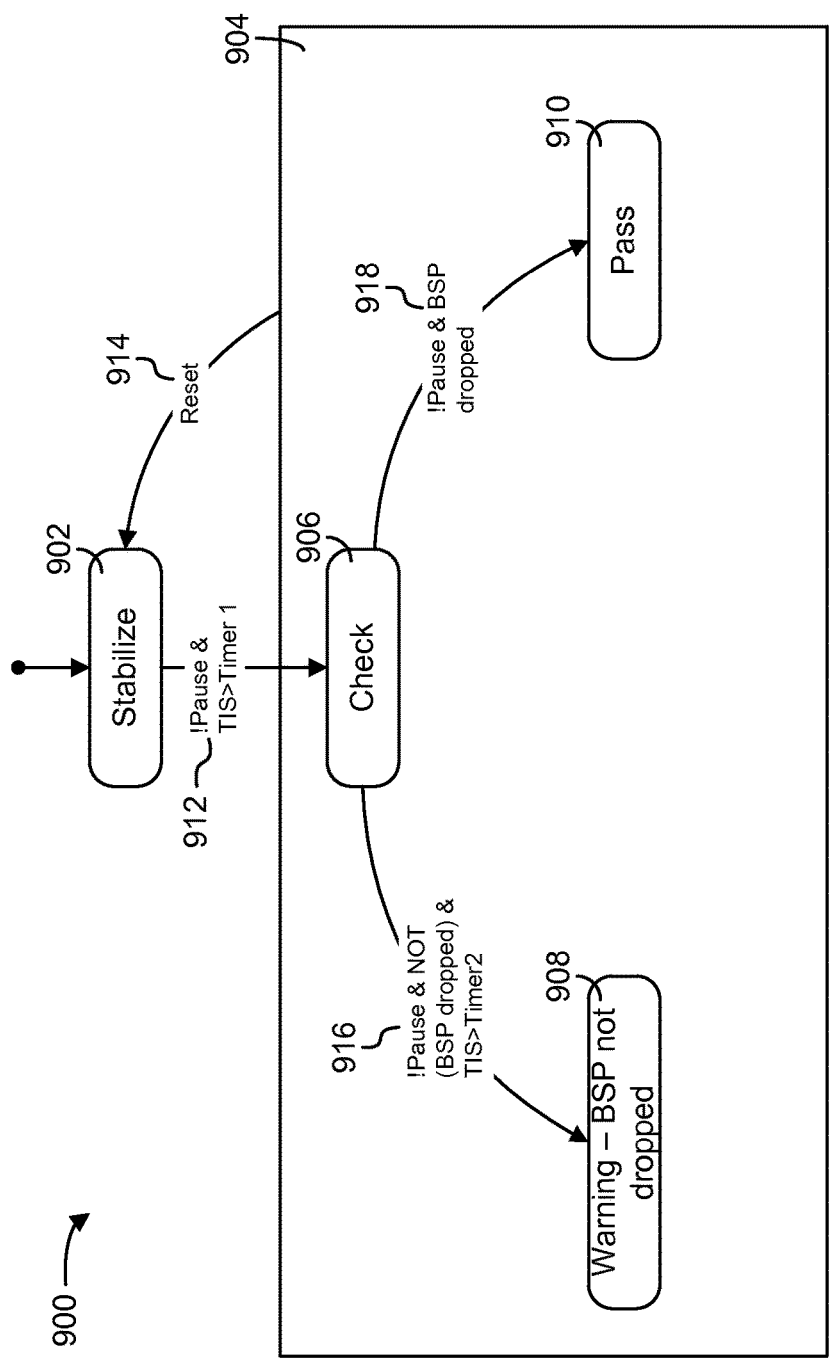
FIG. 9 is a state transition diagram which may be used by the self-testing module of FIG. 2 to perform a state-based diagnostic test of an exhaust element of the building management system, according to an exemplary embodiment.

Referring now to FIG. 9, a state transition diagram 900 illustrating a state-based exhaust testing procedure is shown, according to an exemplary embodiment. State transition diagram 900 illustrates various operating states 902-910 and transition conditions 912-918 for transitioning between operating states 902-910. In some embodiments, the state-based exhaust testing procedure may be performed by exhaust testing module 426. Exhaust testing module 426 may receive an input state (e.g., one of operating states 902-910) from state detection module 412. In each operating state, exhaust testing module 426 may evaluate one or more of transition conditions 912-918 to determine whether to transition into another operating state.

State transition diagram 900 is shown to include a "Stabilize" state 902. Exhaust testing module 426 may transition into stabilize state 902 in response to an input to initiate the state-based exhaust testing procedure (e.g., "Exhaust to test=True" and "State=Test Exhaust"). In stabilize state 902, exhaust testing module 426 may deactivate a power exhaust element of BMS 20. For example, exhaust testing module 426 may close an exhaust damper or deactivate a fan associated with the power exhaust element. In stabilize state 902, exhaust testing module 426 may evaluate transition condition 912. If transition condition 912 is satisfied, exhaust testing module 426 may transition into check state 906. Transition condition 912 may be satisfied when the time in state 902 (TIS) exceeds a threshold value (e.g., "TIS>Timer 1"). In some embodiments, exhaust testing module 426 measures a building static pressure (BSP) upon satisfaction of transition condition 912 (e.g., at the beginning of check state 906).

In some embodiments, exhaust testing module 426 measures an inside static pressure and an outside static pressure before beginning the exhaust test (e.g., during or prior to entering stabilize state 902). If the outside air pressure is close to the inside air pressure (e.g., within a threshold difference), exhaust testing module 426 may delay the exhaust test until a later time. By delaying the exhaust test until the outside pressure and the inside pressure are significantly different (e.g., different by an amount exceeding a threshold value), exhaust testing module 426 can ensure that the proper functioning of the tested exhaust component will result in a difference in building static pressure (e.g., for non-powered exhaust systems).

In some operating states, pause input 314 may prevent transitioning into another operating state. For example, each of state transitions 912 and 916-918 may require that pause input 314 not be active (i.e., "!Pause," "Pause=False") in order to transition into another operating state. When pause input 314 is active, state transitions 912 and 916-918 may be prevented until the pause timer expires or until pause is cancelled. State transition 914 does not have a pause input requirement and may occur regardless of the value of pause input 314. When reset input 312 is active (e.g., "Reset=True," transition condition 914), exhaust testing module 426 may transition from testing state 904 to stabilize state 902.

Testing state 904 is shown to include a plurality of sub-states 906-910. When transition condition 912 is satisfied, the testing procedure may transition into check state 906. In check state 906, exhaust testing module 426 may activate the exhaust element being tested. Activating an exhaust element may include, for example, opening an exhaust damper, powering an exhaust fan or driver, or otherwise activating a component configured to provide exhaust functionality for BMS 20.

In check state 906, exhaust testing module 426 may evaluate transition conditions 916-918. If transition condition 916 is satisfied (i.e., "!Pause & NOT (BSP dropped) and TIS>Timer 2"), exhaust testing module 426 may transition into state 908. State 908 is shown as a warning state (i.e., "Warning BSP not dropped") indicating that the building static pressure (BSP) has not decreased by an amount sufficient to trigger the variable "BSP dropped" (i.e., BSP dropped=False). If transition condition 918 is satisfied (i.e., "!Pause & BSP dropped"), exhaust testing module 426 may transition into state 910. State 910 is shown as a pass state (i.e., "Pass") indicating that the building static pressure has decreased by an amount sufficient to trigger the variable "BSP dropped" (i.e., BSP dropped=True).

In an exemplary embodiment, transition conditions 916 and 918 may require that a measured input associated with the exhaust element (e.g., a pressure, an air quality, a temperature, a humidity, etc.) change by an amount exceeding a threshold value. The threshold value may be a predetermined value or a calculated value (e.g., based on an initial measurement collected at the beginning of check state 906). For example, transition conditions 916 and 918 may require that a measured pressure change by a predetermined amount or to a percentage of the initial measured value in response to activating the exhaust element.

Figure 10:
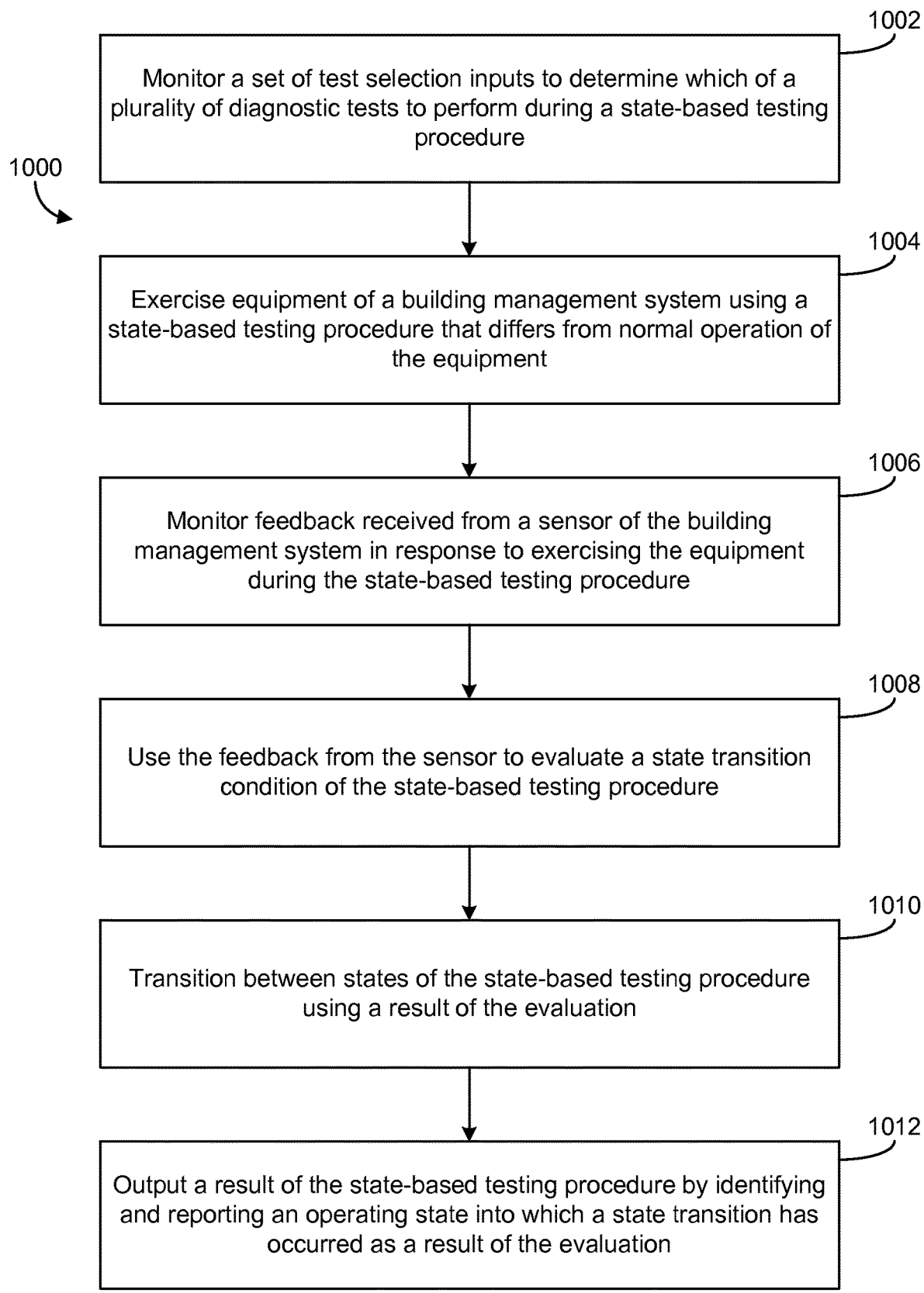
FIG. 10 is a flowchart of a process which may be performed by the self-testing module of FIG. 2 for performing auto-commissioning and self-diagnostics of equipment in a building management system, according to an exemplary embodiment.

Referring now to FIG. 10, a flowchart of a process 1000 for performing automated testing and self-diagnostics of equipment in building management system is shown, according to an exemplary embodiment. Process 1000 may be performed self-testing module 52, as described with reference to FIGS. 2-4. Advantageously, self-testing module 52 may perform some or all of process 1000 in an automated manner requiring little or no human intervention.

Still referring to FIG. 10, process 1000 is shown to include monitoring a set of test selection inputs to determine which of a plurality of diagnostic tests to perform during a state-based testing procedure (step 1002). The test selection inputs may be the same or similar to test selection inputs 310, as described with reference to FIG. 3. In various embodiments, the test selection inputs may be Boolean inputs (e.g., true or false) or enumerated value inputs indicating whether to test a particular component of the building management system. The test selection inputs may be set by a user (e.g., via a user interface of main control unit 30, via a remote user interface, etc.) or provided to self-testing module 52 as an output of an automated test selection process (e.g., in response to detecting a potential fault in a component of BMS 20).

In some embodiments, the diagnostic tests include one or more of a state-based fan diagnostic, a state-based cooling system diagnostic, a state-based heating system diagnostic, a state-based economizer diagnostic, and a state-based exhaust system diagnostic. In some embodiments, each test selection input corresponds to a particular component of the building management system. For example, the test selection inputs may include different inputs for various elements of the cooling system (e.g., compressor "C1," "compressor "C2," etc.), heating system (e.g., heating element "H1," heating element "H2," etc.), fan system (e.g., "Fan 1," "Fan 2," etc.), or other components of the building management system.

Step 1002 may include selecting one or more diagnostic tests to perform using the set of test selection inputs. For example, if the value of the test selection input "Fan to test" is true, step 1002 may include selecting the state-based fan diagnostic. In some embodiments step 1002 may be omitted and process 1000 may begin with step 1004. For example, in some implementations, the diagnostic tests to perform may be predetermined and/or not dependent on the state selection inputs.

Still referring to FIG. 10, process 1000 is shown to include exercising equipment of the building management system using a state-based testing procedure that differs from normal operation of the equipment (step 1004). Step 1004 may be performed by modules 418-428 as described with reference to FIG. 4A. In step 1004, self-testing module 52 may interact with one or more control devices (e.g., control devices 44-45, fans, compressors, heating elements, pumps, chillers, dampers, etc.) of the building management system. Self-testing module 52 may communicate with the control devices directly or via one or more auxiliary controllers. For example, self-testing module 52 may provide a control signal to an auxiliary controller which provides an output to the control devices.

In the state-based testing procedure, self-testing module 52 may operate as a finite state machine. For each diagnostic test, self-testing module may operate in a current operating state. In some embodiments, self-testing module 52 operates in multiple different operating states simultaneously. Each of the multiple different operating states may be a current operating state of a different diagnostic test. For example, a state-based fan diagnostic test may have a current operating state of "Fan State=Available" while a state-based cooling element diagnostic test may have a current operating state of "C1 State=Check." The multiple diagnostic tests may be performed concurrently, sequentially, or in any combination thereof. In some embodiments, the self-testing procedure includes performing the fan diagnostic test before performing any of the other diagnostic tests.

In step 1004, the building equipment may be exercised in a manner that differs from normal operation of the building equipment. For example, the tested building equipment may be deactivated for a period of time in order to allow conditions to stabilize. After the stabilization period has expired, the tested building equipment may be activated at maximum output. The manner in which the building equipment is exercised in step 1004 may selected such that an effect of the building equipment is readily observable if the building equipment is functioning properly. For example, step 1004 may include running a first compressor at full power while deactivating other compressors in order to determine whether the first compressor is functioning properly. In some embodiments, step 1004 may be performed at a time when normal operation of the building equipment is not required. For example, step 1004 may be performed at night or over a weekend when building occupancy is minimal.

Still referring to FIG. 10, process 1000 is shown to include monitoring feedback received from a sensor of the building management system in response to exercising the equipment during the state-based testing procedure (step 1006). In step 1006, self-testing module 52 may monitor one or more inputs received from measurement devices of the building management system (e.g., measurement devices 42-43). Monitored inputs may include, for example, pressure sensor inputs, temperature sensor inputs, flow rate sensor inputs, voltage sensor inputs, humidity sensor inputs, or other inputs which depend on a variable state or condition of the building management system.

In various embodiments, step 1006 includes monitoring the values of floating inputs, enumerated value inputs, binary inputs, analog inputs, Boolean inputs, or any combination thereof. Monitored inputs may include some or all of inputs 302, as described with reference to FIG. 3. For example, monitored inputs may include enumerated value inputs or Boolean inputs received from various switches (e.g., high pressure switches, low pressure switches, limit switches, air proving switches, etc.). The values of the monitored inputs may be dependent on a state or condition of the building management system which is affected by exercising the building equipment (e.g., in step 1004). In some embodiments, monitoring feedback received from the building management system facilitates a determination of whether the building equipment is operating properly (e.g., whether the building equipment effectively changes the monitored variable state or condition).

Still referring to FIG. 10, process 1000 is shown to include using the feedback from the sensor to evaluate a state transition condition of the state-based testing procedure (step 1008). A state transition condition may include one or more criteria for transitioning from a current operating state to another operating state. Several exemplary state transition conditions are described in detail with reference to FIGS. 5-9 (e.g., state transition conditions 524-550, 620-640, 720-744, 814-822 and 912-918). For example, state transition condition 546 is shown in FIG. 5 as "!Pause & DSP>DSP Setpoint." For state transition condition 546 to be satisfied, the value of pause input 314 must not be true (i.e., "!Pause") and the value of the measured variable for duct static pressure (DSP) must be greater than the DSP setpoint.

Some state transition conditions may require that a value of a measured variable be greater than (or less than) a threshold value or a setpoint. Other state transition conditions may require that an input state match an enumerated value or a Boolean value (e.g., "APS=On"). Some state transition conditions may require that a time in the current operating state exceed a time threshold (e.g., "TIS>Timer 2"). Step 1008 may include using the feedback from the building management system to determine whether one or more state transition conditions are satisfied.

In some embodiments, step 1008 includes identifying a plurality of state transition conditions. Each state transition condition may include one or more criteria for transitioning into a different potential operating state. Step 1008 may include using feedback from the building management system to evaluate the plurality of state transition conditions. Evaluating a state transition condition may include determining whether the state transition condition is satisfied. If all of the criteria of a state transition condition are true, the state transition condition is satisfied.

Still referring to FIG. 10, process 1000 is shown to include transitioning between states of the state-based testing procedure using a result of the evaluation (step 1010). Step 1010 may be performed in response to a determination (e.g., in step 1008) that a state transition condition is satisfied. In some embodiments, step 1010 includes transitioning into one of multiple potential operating states using a result of the evaluation. Each operating state may indicate a different result of the state-based testing procedure. For example, as shown in FIG. 5, fan testing module 418 may transition into a "Pass" state (e.g., state 516) in response to a determination that state transition condition 538 is satisfied. However, if state transition condition 536 is satisfied, fan testing module 418 may transition into a "Fail—APS Off" state (e.g., state 514).

Still referring to FIG. 10, process 1000 is shown to include outputting a result of the state-based testing procedure by identifying and reporting an operating state into which a state transition has occurred as a result of the evaluation (step 1012). The state into which a state transition has occurred may indicate a result of the state-based testing procedure. For example, an attribute of the state (e.g., a state name, a state label, a state property, etc.) may provide information regarding a result of the test. The state into which a state transition has occurred may indicate whether the test resulted in a pass, a failure, or a warning. If the rest resulted in a warning or a failure, the result state may provide details for why the warning or failure occurred (e.g., "Fail—Low DSP").

Identifying an operating state into which a state transition has occurred may include identifying one or more output states from self-testing module 52 (e.g., output states 308 as described with reference to FIG. 3). Output states may include, for example, a current operating state for each component of the building management system tested in the state-based testing procedure. Output states may indicate a current state status of each diagnostic test (e.g., "Available," "Check," "Not Run," etc.) as well as result states for tests that have completed.

In some embodiments, step 1012 includes providing results of the state-based testing procedure to a user interface. The user interface may be a local user interface or a remote user interface. The results may include an indication of a particular state-based test (e.g., "Test C1") and a current state status of the particular state-based test (e.g., "Check"). In other embodiments, step 1012 includes storing or logging the test results (e.g., in memory, in a data storage device, in a results table, etc.). The test results may provide diagnostic information for various components of the building management system. Advantageously, the particular cause of failure provided in the test results may allow a faulty component to be readily identified and repaired.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for performing a cooling component diagnostic test in a building heating, ventilation, and air conditioning (HVAC) system using a state-based testing procedure, the method comprising:
   providing a control signal to a cooling component, the control signal instructing the cooling component to activate;
   monitoring feedback from a temperature sensor configured to measure temperature affected by the cooling component; and
   using the feedback from the temperature sensor to transition through a series of discrete operating states of the cooling component diagnostic test until a result state is reached, the discrete operating states comprising at least one testing state in which a state transition condition is evaluated and a plurality of result states indicating different results of the cooling component diagnostic test, wherein transitioning through the series of discrete operating states comprises:
      evaluating the state transition condition by comparing the feedback from the temperature sensor to a threshold value, wherein the state transition condition is satisfied if the feedback from the temperature sensor is less than the threshold value and not satisfied if the feedback from the temperature sensor is not less than the threshold value;
      transitioning into a pass result state indicating a successful result of the cooling component diagnostic test in response to the feedback from the temperature sensor satisfying the state transition condition; and
      transitioning into a fail result state indicating a failure result of the cooling component diagnostic test and a cause of the failure result in response to the feedback from the temperature sensor not satisfying the state transition condition.

2. The method of claim 1, wherein the providing, monitoring, using, evaluating, and transitioning steps are performed automatically by a self-testing module implemented in a control unit of the building HVAC system;
   wherein the self-testing module is configured to operate as a finite state machine, using feedback from the building HVAC system to control transitions between operating states of the state-based testing procedure.

3. The method of claim 1, further comprising:
   monitoring a set of test selection inputs, each of the test selection inputs corresponding to a different diagnostic test; and
   using the set of test selection inputs to determine which of a plurality of diagnostic tests to perform during the state-based testing procedure.

4. The method of claim 1, further comprising:
   identifying a plurality of state transition conditions, each state transition condition comprising a criterion for transitioning into a different potential operating state;
   using feedback from the building HVAC system to evaluate the plurality of state transition conditions; and
   transitioning into one of the potential operating states using a result of the evaluation.

5. The method of claim 4, wherein each of the potential operating states indicates a different result of the state-based testing procedure, the method further comprising:
outputting a result of the state-based testing procedure by identifying and reporting an operating state into which a state transition has occurred as a result of the evaluation.

6. The method of claim 1, further comprising presenting results of the state-based testing procedure via a user interface, the results comprising an indication of a result state into which a state transition has occurred as a result of the state-based testing procedure.

7. The method of claim 1, further comprising:
providing a control signal to a fan in the building HVAC system, the control signal instructing the fan to activate;
monitoring feedback from a flow sensor configured to measure airflow caused by the fan;
using the feedback from the flow sensor to transition through a series of discrete operating states of the cooling component diagnostic test until a result state is reached, the discrete operating states comprising at least one testing state in which a state transition condition is evaluated and a plurality of result states indicating different results of the cooling component diagnostic test, wherein transitioning through the series of discrete operating states comprises:
evaluating the state transition condition using the feedback from the flow sensor, wherein the state transition condition is satisfied if the feedback from the flow sensor indicates that the fan is providing airflow and not satisfied if the feedback from the flow sensor indicates that the fan is not providing airflow;
transitioning into a pass result state in response to the feedback from the flow sensor satisfying the state transition condition; and
transitioning into a fail result state in response to the feedback from the flow sensor not satisfying the state transition condition.

8. A method for performing a heating component diagnostic test in a building heating, ventilation, and air conditioning (HVAC) system using a state-based testing procedure, the method comprising:
providing a control signal to a heating component, the control signal instructing the heating component to activate;
monitoring feedback from a temperature sensor configured to measure temperature affected by the heating component; and
using the feedback from the temperature sensor to transition through a series of discrete operating states of the heating component diagnostic test until a result state is reached, the discrete operating states comprising at least one testing state in which a state transition condition is evaluated and a plurality of result states indicating different results of the heating component diagnostic test, wherein transitioning through the series of discrete operating states comprises:
evaluating the state transition condition by comparing the feedback from the temperature sensor to a threshold value, wherein the state transition condition is satisfied if the feedback from the temperature sensor is greater than the threshold value and not satisfied if the feedback from the temperature sensor is not greater than the threshold value;
transitioning into a pass result state indicating a successful result of the heating component diagnostic test in response to the feedback from the temperature sensor satisfying the state transition condition; and
transitioning into a fail result state indicating a failure result of the heating component diagnostic test and a cause of the failure result in response to the feedback from the temperature sensor not satisfying the state transition condition.

9. The method of claim 8, wherein the providing, monitoring, using, evaluating, and transitioning steps are performed automatically by a self-testing module implemented in a control unit of the building HVAC system;
wherein the self-testing module is configured to operate as a finite state machine, using feedback from the building HVAC system to control transitions between operating states of the state-based testing procedure.

10. The method of claim 8, further comprising:
monitoring a set of test selection inputs, each of the test selection inputs corresponding to a different diagnostic test; and
using the set of test selection inputs to determine which of a plurality of diagnostic tests to perform during the state-based testing procedure.

11. The method of claim 8, further comprising:
identifying a plurality of state transition conditions, each state transition condition comprising a criterion for transitioning into a different potential operating state;
using feedback from the building HVAC system to evaluate the plurality of state transition conditions; and
transitioning into one of the potential operating states using a result of the evaluation.

12. The method of claim 11, wherein each of the potential operating states indicates a different result of the state-based testing procedure, the method further comprising:
outputting a result of the state-based testing procedure by identifying and reporting an operating state into which a state transition has occurred as a result of the evaluation.

13. The method of claim 8, further comprising presenting results of the state-based testing procedure via a user interface, the results comprising an indication of a result state into which a state transition has occurred as a result of the state-based testing procedure.

14. The method of claim 8, further comprising:
providing a control signal to a fan in the building HVAC system, the control signal instructing the fan to activate;
monitoring feedback from a flow sensor configured to measure airflow caused by the fan;
using the feedback from the flow sensor to transition through a series of discrete operating states of the cooling component diagnostic test until a result state is reached, the discrete operating states comprising at least one testing state in which a state transition condition is evaluated and a plurality of result states indicating different results of the heating component diagnostic test, wherein transitioning through the series of discrete operating states comprises:
evaluating the state transition condition using the feedback from the flow sensor, wherein the state transition condition is satisfied if the feedback from the flow sensor indicates that the fan is providing airflow and not satisfied if the feedback from the flow sensor indicates that the fan is not providing airflow;
transitioning into a pass result state in response to the feedback from the flow sensor satisfying the state transition condition; and transitioning into a fail result state in response to the feedback from the flow sensor not satisfying the state transition condition.

15. A method for performing an economizer diagnostic test in a building heating, ventilation, and air conditioning (HVAC) system using a state-based testing procedure, the method comprising:
providing a control signal to an economizer component configured to affect airflow through the economizer, the control signal instructing the economizer component to activate;
monitoring feedback from a sensor configured to measure an attribute of supply air provided by the economizer before and after providing the control signal, the attribute comprising at least one of a temperature of the supply air and a flowrate of the supply air;
using the feedback from the sensor to transition through a series of discrete operating states of the economizer diagnostic test until a result state is reached, the discrete operating states comprising at least one testing state in which a state transition condition is evaluated and a plurality of result states indicating different results of the economizer diagnostic test, wherein transitioning through the series of discrete operating states comprises:
evaluating the state transition condition by determining whether the feedback from the sensor changes as a result of providing the control signal, wherein the state transition condition is satisfied if the feedback from the sensor changes as a result of providing the control signal and not satisfied if the feedback from the sensor does not change as a result of providing the control signal;
transitioning into a pass result state indicating a successful result of the economizer diagnostic test in response to the feedback from the sensor satisfying the state transition condition; and
transitioning into a fail result state indicating a failure result of the economizer diagnostic test and a cause of the failure result in response to the feedback from the sensor not satisfying the state transition condition.

16. The method of claim 15, wherein the providing, monitoring, using, evaluating, and transitioning steps are performed automatically by a self-testing module implemented in a control unit of the building HVAC system;
wherein the self-testing module is configured to operate as a finite state machine, using feedback from the building HVAC system to control transitions between operating states of the state-based testing procedure.

17. The method of claim 15, further comprising:
monitoring a set of test selection inputs, each of the test selection inputs corresponding to a different diagnostic test; and
using the set of test selection inputs to determine which of a plurality of diagnostic tests to perform during the state-based testing procedure.

18. The method of claim 15, further comprising:
identifying a plurality of state transition conditions, each state transition condition comprising a criterion for transitioning into a different potential operating state;
using feedback from the building HVAC system to evaluate the plurality of state transition conditions; and
transitioning into one of the potential operating states using a result of the evaluation.

19. The method of claim 18, wherein each of the potential operating states indicates a different result of the state-based testing procedure, the method further comprising:
outputting a result of the state-based testing procedure by identifying and reporting an operating state into which a state transition has occurred as a result of the evaluation.

20. The method of claim 15, further comprising presenting results of the state-based testing procedure via a user interface, the results comprising an indication of a result state into which a state transition has occurred as a result of the state-based testing procedure.

21. The method of claim 1, wherein the control signal provided to the cooling component exercises the cooling component in a manner that differs from normal operation of the cooling component and enhances an effect of exercising the cooling component on the measured temperature relative to the normal operation of the cooling component.

22. The method of claim 8, wherein the control signal provided to the heating component exercises the heating component in a manner that differs from normal operation of the heating component and enhances an effect of exercising the heating component on the measured temperature relative to the normal operation of the heating component.

23. The method of claim 15, wherein the control signal provided to the economizer component exercises the economizer component in a manner that differs from normal operation of the economizer component and enhances an effect of exercising the economizer component on the measured attribute of the supply air relative to the normal operation of the economizer component.

* * * * *